(12) United States Patent
Yokoyama

(10) Patent No.: US 8,160,151 B2
(45) Date of Patent: Apr. 17, 2012

(54) MOTION VECTOR DETECTION APPARATUS, MOTION VECTOR PROCESSING METHOD AND PROGRAM

(75) Inventor: Masayuki Yokoyama, Tokyo (JP)

(73) Assignee: Sony Corporation, Tokyo (JP)

( * ) Notice: Subject to any disclaimer, the term of this patent is extended or adjusted under 35 U.S.C. 154(b) by 400 days.

(21) Appl. No.: 12/585,601

(22) Filed: Sep. 18, 2009

(65) Prior Publication Data

US 2010/0111185 A1 May 6, 2010

(30) Foreign Application Priority Data

Nov. 5, 2008 (JP) .................................. 2008-284627

(51) Int. Cl.
*H04B 1/66* (2006.01)
(52) U.S. Cl. ................................................. 375/240.16
(58) Field of Classification Search ............. 375/240.16, 375/240, 240.12, 240.01; 348/699, 239, 348/248, 251, 261
See application file for complete search history.

(56) References Cited

U.S. PATENT DOCUMENTS

| 7,075,989 B2* | 7/2006 | Murakami et al. ....... 375/240.16 |
| 7,343,045 B2* | 3/2008 | Onuma et al. ................. 382/239 |
| 8,064,522 B2* | 11/2011 | Kondo et al. ............ 375/240.16 |

FOREIGN PATENT DOCUMENTS

JP 2004-206638 7/2004

* cited by examiner

*Primary Examiner* — Hanh Nguyen
(74) *Attorney, Agent, or Firm* — Rader, Fishman & Grauer PLLC

(57) ABSTRACT

A motion vector detection apparatus includes: a base luminance value production section configured to produce a base luminance value of the base block; an effectiveness calculation section configured to calculate an effectiveness degree of each of the pixels of the base block based on luminance values of the pixels of the base block and the base luminance value; a correlation calculation section configured to calculate a correlation degree of the reference block with the base block for each of the reference blocks; a position acquisition section configured to acquire the position of that one of the reference blocks set in the reference frame which exhibits the highest correlation degree with the base block; and a motion vector calculation section configured to calculate a motion vector based on the position of the reference block acquired by the position acquisition section and the position of the base block.

12 Claims, 17 Drawing Sheets

FIG.3A

| #1 (176) | #2 (161) | #3 (166) | #4 (171) | #5 (144) |
|---|---|---|---|---|
| #6 (134) | #7 (149) | #8 (154) | #9 (151) | #10 (155) |
| #11 (147) | #12 (153) | #13 (150) | #14 (147) | #15 (31) |
| #16 (29) | #17 (66) | #18 (81) | #19 (63) | #20 (21) |
| #21 (33) | #22 (78) | #23 (48) | #24 (36) | #25 (54) |

FIG.3B

| #1 (176) | #2 (161) | #3 (166) | #4 (171) |
|---|---|---|---|
| #6 (134) | #7 (149) | #8 (154) | #9 (151) |
| #11 (147) | #12 (153) | #13 (150) | #14 (147) |
| #16 (29) | #17 (66) | #18 (81) | #19 (63) |

| #1<br>(176) | #2<br>(161) | #3<br>(166) | #4<br>(171) | #5<br>(144) |
|---|---|---|---|---|
| #6<br>(134) | #7<br>(149) | #8<br>(154) | #9<br>(151) | #10<br>(155) |
| #11<br>(147) | #12<br>(153) | #13<br>(150) | #14<br>(147) | #15<br>(31) |
| #16<br>(29) | #17<br>(66) | #18<br>(81) | #19<br>(63) | #20<br>(21) |
| #21<br>(33) | #22<br>(78) | #23<br>(48) | #24<br>(36) | #25<br>(54) |

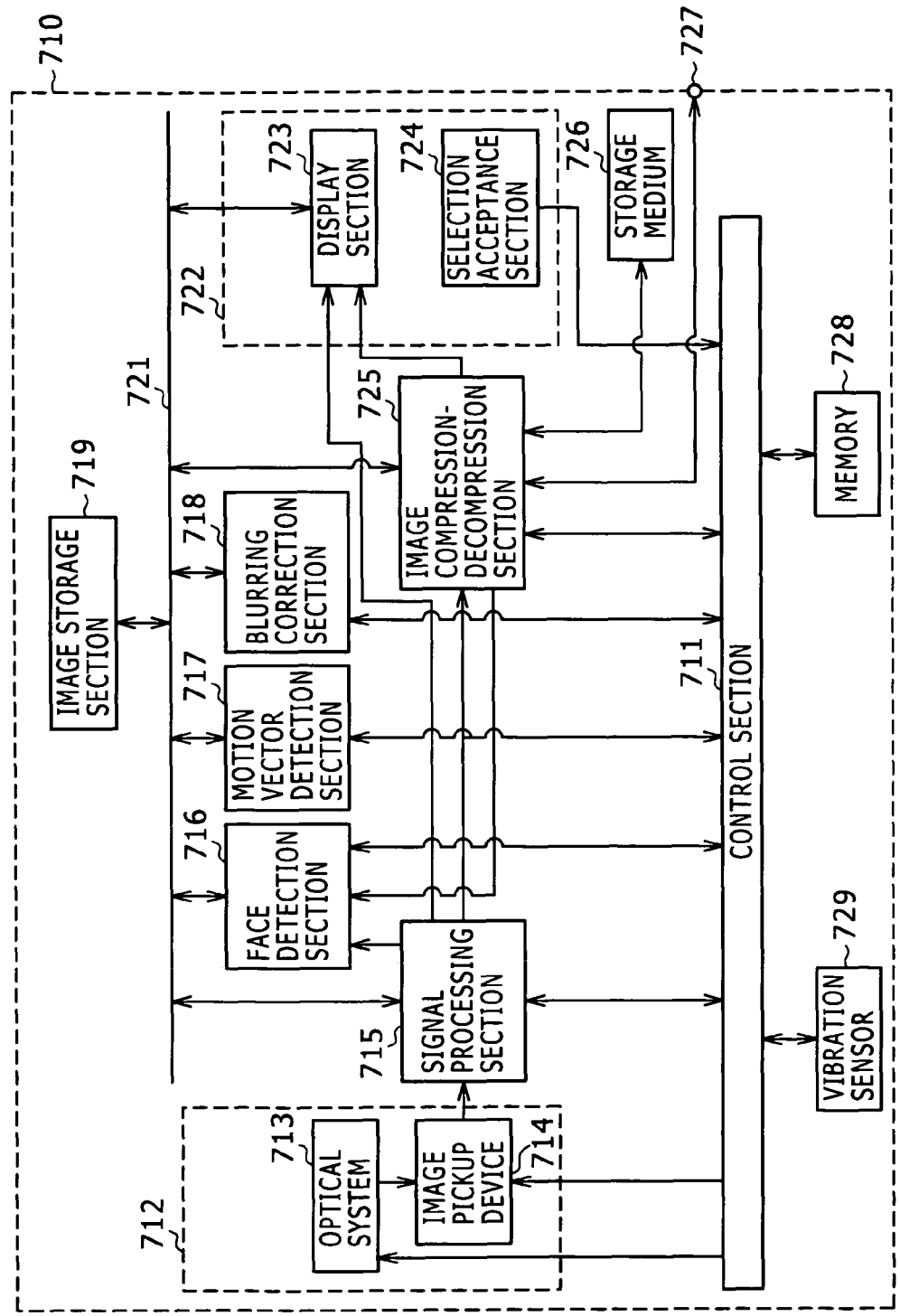

MOTION VECTOR DETECTION APPARATUS, MOTION VECTOR PROCESSING METHOD AND PROGRAM

1. FIELD OF THE INVENTION

This invention relates to motion vector detection apparatuses, and more particularly to a motion vector detection apparatus which uses a block matching method to detect a motion vector and a processing method of a motion vector as well as a program for causing a computer to execute the method.

2. DESCRIPTION OF THE RELATED ART

When a dynamic picture is handled, an image encoding process of compressing information for reducing the information amount is carried out. In such an image encoding process as just mentioned, compression of information is carried out based on a motion vector of an object between frames forming a dynamic picture. As a technique for detecting a motion vector, a block matching method has been proposed and is disclosed, for example, in Japanese Patent Laid-Open No. 2004-206638 (FIG. 1). According to the technique, one frame is divided into a plurality of blocks, and such blocks of different frames are compared with each other in a unit of a block to detect a motion vector of an object.

SUMMARY OF THE INVENTION

With the existing technique described above, a motion vector of an object included in a frame can be detected using the block matching method. However, where the background varies or a plurality of moving objects are positioned adjacent each other or in a like case, since the correlation degree between blocks is low, it is sometimes difficult to detect a motion vector accurately.

Therefore, it is desirable to provide a motion vector detection apparatus and a processing method of a motion vector as well as a program by which the accuracy in detection of a motion vector can be improved.

According to an embodiment of the present invention, there is provided a motion vector detection apparatus including a base luminance value production section, an effectiveness calculation section, a correlation calculation section, a position acquisition section, and a motion vector calculation section. The base luminance value production section is configured to produce, based on a luminance value of a predetermined one of pixels of a base block set in a base frame, a base luminance value of the base block. The effectiveness calculation section is configured to calculate an effectiveness degree of each of the pixels of the base block based on luminance values of the pixels of the base block and the base luminance value. The correlation calculation section is configured to calculate, based on the luminance values of the pixels of the base block, luminance values of pixels in a plurality of reference blocks set in a reference frame which correspond to pixel positions of the base block and the effectiveness degrees corresponding to the pixel positions of the base block, a correlation degree of the reference block with the base block for each of the reference blocks. The position acquisition section is configured to acquire the position of that one of the reference blocks set in the reference frame which exhibits the highest correlation degree with the base block. The motion vector calculation section is configured to calculate a motion vector based on the position of the reference block acquired by the position acquisition section and the position of the base block. Also a processing method for the motion vector detection apparatus and a program for causing a computer to execute the processing method are provided. With the motion vector detection apparatus, processing method and program, a correlation degree between a base block and each reference block is calculated based on an effectiveness degree corresponding to each of the pixel positions of the base block.

The effectiveness calculation section may calculate the effectiveness degree such that, where a difference absolute value between the base luminance value and the luminance value of each of the pixels of the base block is lower than a predetermined threshold value, the effectiveness degree exhibits a value higher than that in any other case. With the motion vector detection apparatus, the effectiveness degree of a pixel having a luminance value proximate to the base luminance value is set to a comparatively high value. In this instance, the effectiveness calculation section may calculate the effectiveness degree such that, where the difference absolute value between the base luminance value and the luminance value of each of the pixels of the base block is lower than the predetermined threshold value, the effectiveness degree exhibits a fixed value. With the motion vector detection apparatus, the effectiveness degree of a pixel having a luminance value proximate to the base luminance value is set to a fixed value.

Where the effectiveness calculation section calculates the effectiveness degree such that, where a difference absolute value between the base luminance value and the luminance value of each of the pixels of the base block is lower than a predetermined threshold value, the effectiveness degree exhibits a value higher than that in any other case, the effectiveness calculation section may calculate the effectiveness degree such that, where the difference absolute value between the base luminance value and the luminance value of each of the pixels of the base block is lower than the predetermined threshold value, the effectiveness degree exhibits a value which increases in inverse proportion to the difference absolute value. With the motion vector detection apparatus, as the luminance value of a pixel becomes closer to the base luminance value, the effectiveness degree of the pixel exhibits a higher value.

The base luminance value production section may produce a statistical value based on the luminance value of the predetermined pixel in the base block as the base luminance value. With the motion vector detection apparatus, a statistical value is calculated from the luminance value of the predetermined pixel in the base block to produce a base luminance value. In this instance, the base luminance value production section may produce the statistical value based on the luminance value of the predetermined pixel which is positioned in the proximity of the center of the base block. With the motion vector detection apparatus, a statistical value is calculated from the luminance value of the predetermined pixel positioned in the proximity of the center of the base block to produce a base luminance value.

The base luminance value production section may produce a luminance value of one of the pixels in the base block as the base luminance value. With the motion vector detection apparatus, a base luminance value is produced from the luminance value of one pixel in the base block.

The correlation degree calculation section may calculate the correlation value of each of the pixels of the reference block based on the luminance values of the pixels of the base block, the luminance values of the pixels of the reference block which correspond to the pixel positions of the base block and the effectiveness degrees corresponding to the pixel positions of the base block, and carry out sum total arithmetic operation of the correlation values of the pixels to calculate the correlation degree of the reference block. With the motion vector detection apparatus, the correlation degree of the reference block is calculated from the sum total of the correlation values between the pixels of the base block and the pixels of the reference block corresponding to the pixel positions of the base bloc. In this instance, the correlation degree calculation section may multiply a difference absolute value between the luminance value of each of the pixels in the base block and the luminance value of each of the pixels in the reference block which correspond to the pixel positions of the base block by the effectiveness degree corresponding to the pixel position of the base block to calculate the correlation value. With the motion vector detection apparatus, a difference absolute value between the luminance value of each of the pixels in the base block and the luminance value of each of the pixels in the reference block which correspond to the pixel positions of the base block is multiplied by the effectiveness degree corresponding to the pixel position of the base block to calculate the correlation value.

The motion vector detection apparatus, processing method and program can achieve a superior advantage that the detection accuracy of a motion vector can be improved.

BRIEF DESCRIPTION OF THE DRAWINGS

FIGS. 3A and 3B are diagrammatic views illustrating an example of production of a base luminance value by a base luminance value production section of the motion vector detection apparatus of FIG. 1;

FIG. 4 is a diagrammatic view illustrating an example of calculation of an effectiveness degree by an effectiveness degree calculation section of the motion vector detection apparatus of FIG. 1;

FIG. 17 is a block diagram showing an example of a configuration of an image pickup apparatus used in the motion detection apparatus according to the present embodiment.

DETAILED DESCRIPTION OF THE PREFERRED EMBODIMENTS

In the following, the present invention is described in connection with preferred embodiments thereof. The description is given in the following order:
1. First Embodiment (block matching calculation control: example wherein an effectiveness degree is applied to each pixel)
2. Second Embodiment (motion vector detection control: example wherein a search region is controlled upwardly, downwardly, leftwardly and rightwardly)
3. Third Embodiment (motion vector detection control: example of application of hierarchical ME (motion estimation))
4. Fourth. Embodiment (motion vector detection control: combination of the example wherein an effectiveness degree is applied to each pixel and the example wherein a search region is controlled)

1. First Embodiment

[Example of a Functional Configuration of a Motion Vector Detection Apparatus]

Figure 1:
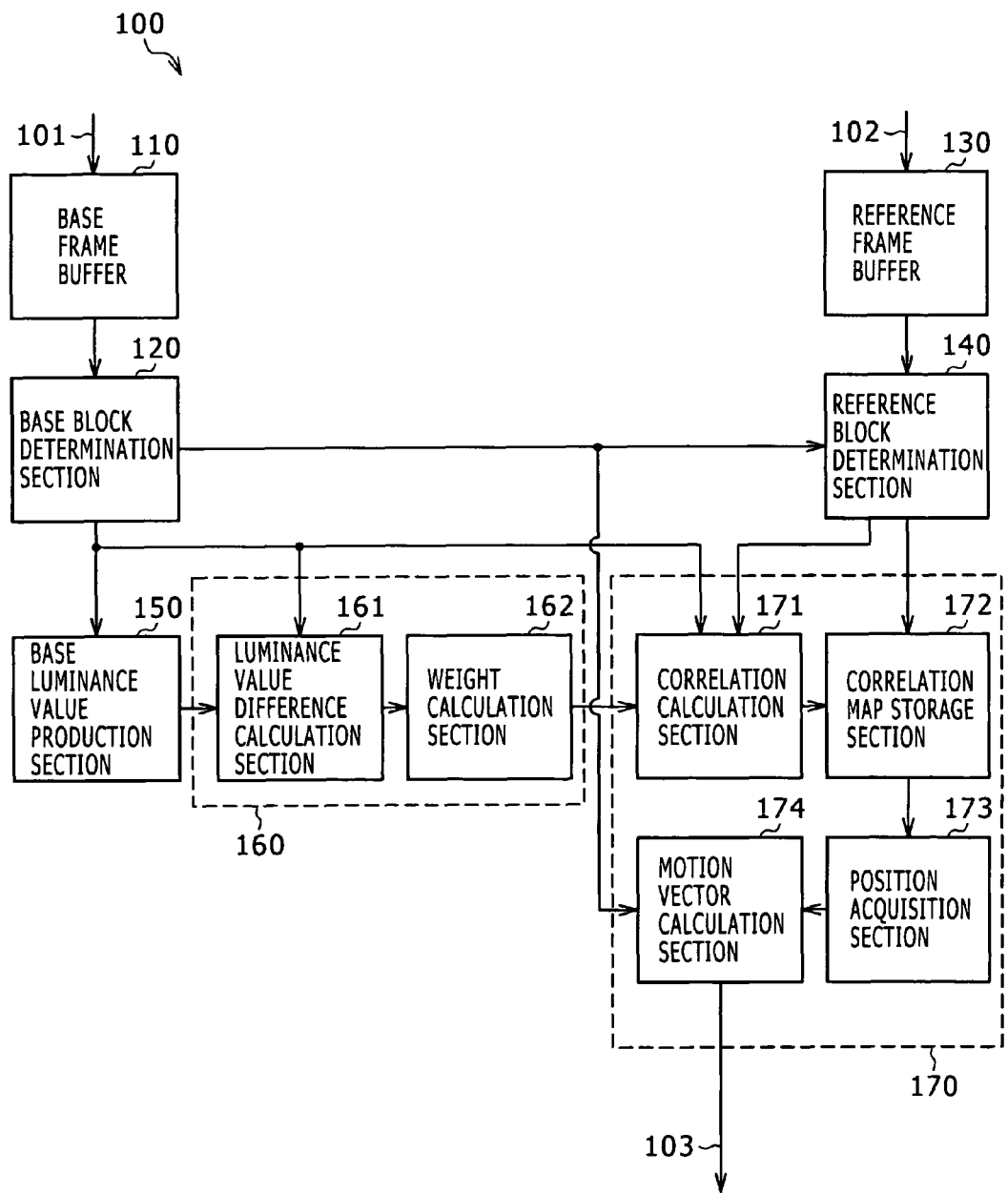
FIG. 1 is a block diagram showing an example of a functional configuration of a motion vector detection apparatus according to a first embodiment of the present invention.

FIG. 1 shows an example of a functional configuration of a motion vector detection apparatus according to a first embodiment of the present invention. Referring to FIG. 1, the motion vector detection apparatus 100 shown includes a base frame buffer 110, a base block determination section 120, a reference frame buffer 130, a reference block determination section 140, a base luminance value production section 150, an effectiveness calculation section 160 and a block matching calculation section 170.

The base frame buffer 110 temporarily stores an image supplied thereto through a signal line 101 as a current frame. This current frame is an image of a frame at present, for example, of a dynamic picture. The base frame buffer 110 supplies the current frame to the base block determination section 120.

The base block determination section 120 determines a position of a base block with regard to a current frame supplied thereto from the base frame buffer 110 and extracts a luminance of each pixel in the determined base block. It is to be noted that the current block is, for example, a region of a size of the entirety of the current frame or part of the current frame defined in advance by the base block determination section 120. Further, the base block determination section 120 successively moves, for example, the current block in a unit of one pixel in the current frame to determine a position of the current block. Further, the base block determination section 120 successively moves, for example, the current block in a unit of a block in the current frame to determine a position of the current block. Further, the base block determination section 120 supplies the determined luminance value of each pixel in the current block to the base luminance value production section 150, effectiveness calculation section 160 and block matching calculation section 170. Further, the base block determination section 120 supplies the determined position of the current block to the reference block determination section 140 and the block matching calculation section 170.

The reference frame buffer 130 temporarily stores an image supplied thereto through a signal line 102 as a reference frame. This reference frame is an image preceding by one frame to the current frame (forward reference). The reference frame buffer 130 supplies the reference frame to the reference block determination section 140.

The reference block determination section 140 determines a position of a reference block of the reference frame supplied thereto from the reference frame buffer 130 based on the position of the current block supplied thereto from the base block determination section 120. The reference block determination section 140 defines a search region for searching for a motion vector with respect to the base block in the reference frame based on the position of the current block supplied thereto from the base block determination section 120. Then, the reference block determination section 140 determines a position of the reference block in the defined search region. It is to be noted that the search region is a region of a fixed size defined with reference to the position of the current block, for example, by the reference block determination section 140. It is to be noted that the reference block determination section 140 may determine the position of the reference block successively, for example, while spirally moving the same around the position corresponding to the current block. The reference block determination section 140 supplies the luminance value of each pixel of the reference block and the position of the reference block determined in such a manner as described above to the block matching calculation section 170.

The base luminance value production section 150 produces a base luminance value based on the luminance values of the pixels in the entire current block supplied thereto from the base block determination section 120 or in a portion of the current block determined in advance.

The base luminance value here is a luminance value to be used as a base for identification of those pixels which include a moving object in the base block. The base luminance value production section 150 produces a statistical value of all pixels or some pixels in the base block as a base luminance value. The statistical value may be, for example, an average value or an intermediate value. Further, the base luminance value production section 150 produces, for example, a luminance value of one pixel in the base block as a base luminance value. Further the base luminance value production section 150 supplies the thus produced base luminance value to the effectiveness calculation section 160.

The effectiveness calculation section 160 calculates an effectiveness degree of each pixel of the base block based on the luminance value of each pixel of the base block and the base luminance value. The effectiveness calculation section 160 includes a luminance value difference calculation section 161 and a weight calculation section 162.

The luminance value difference calculation section 161 calculates, for each pixel of the base block, a difference absolute value between the base luminance value supplied thereto from the base luminance value production section 150 and the luminance value of the pixel of the base block supplied from the base block determination section 120. The luminance value difference calculation section 161 calculates the difference absolute value D(i,j) in accordance with the following expression:

$$D(i,j) = |I_{base} - I_c(i,j)|$$ expression 1 where $I_{base}$ is a base luminance value supplied from the base luminance value production section 150, and $I_c(i,j)$ is a luminance value of each pixel of the base block supplied from the base block determination section 120. It is to be noted that (i,j) indicates the position of the pixel, and i indicates the position in the vertical direction while j indicates the position in the horizontal direction.

The luminance value difference calculation section 161 supplies the difference absolute value of each pixel of the base block calculated in such a manner as described above to the weight calculation section 162.

The weight calculation section 162 calculates a weight for each pixel of the base block. In particular, the weight calculation section 162 calculates a weight, which is an effectiveness degree of each pixel of the base block, based on the difference absolute value of the pixel of the base block supplied from the luminance value difference calculation section 161. The weight calculation section 162 supplies the weight for each pixel of the base block calculated in this manner to the block matching calculation section 170.

The block matching calculation section 170 carries out block matching based on a correlation degree between the base block and the reference block to calculate a motion vector with respect to the base block. The block matching calculation section 170 includes a correlation calculation section 171, a correlation map storage section 172, a position acquisition section 173 and a motion vector calculation section 174.

The correlation calculation section 171 calculates a weighted SAD (Sum of Absolute Difference) of each reference block with respect to the base block as a correlation degree. In particular, the correlation calculation section 171 multiplies the difference absolute value between the luminance value of each pixel of the base block and the luminance value of each pixel of the reference block corresponding to the pixel position of the base block by the weight corresponding to the pixel position to calculate a correlation value of the pixel. Then, the correlation calculation section 171 sums such correlation values to calculate a weighted SAD. The weighted SAD indicates a higher correlation degree as the value thereof decreases. In particular, the correlation calculation section 171 calculates the weighted SAD in accordance with the following expression:

$$\text{Weighted } SAD = \sum_{i=0, j=0}^{N,N} W(i,j)|I_c(i,j) - I_r(i,j)|$$ expression 2 where Ir(i,j) indicates the luminance value of the pixel corresponding to each pixel position of the base block, and W(i,j) indicates the weight corresponding to each pixel position of the base block.

Further, the correlation calculation section 171 supplies the calculated weighted SAD of each reference block as a correlation degree to the correlation map storage section 172.

The correlation map storage section 172 temporarily stores the correlation degrees of the reference blocks supplied thereto from the correlation calculation section 171 and the positions of the reference blocks supplied thereto from the reference block determination section 140 in an associated relationship with each other. The correlation map storage section 172 supplies the correlation degrees and the positions of all of the reference blocks stored therein to the position acquisition section 173.

The position acquisition section 173 acquires the position of that one of all reference blocks supplied thereto from the correlation map storage section 172 which has the highest correlation degree. In other words, the position acquisition section 173 acquires the position of the reference block which has the lowest weighted SAD. Where the correlation degrees and the positions of all reference blocks are stored in the correlation map storage section 172, the position acquisition section 173 acquires the position of the reference block which has the highest correlation degree. The position acquisition section 173 supplies the acquired position of the reference block to the motion vector calculation section 174.

The motion vector calculation section 174 calculates a motion vector based on the position of the reference block of the highest correlation degree supplied thereto from the position acquisition section 173 and the position of the base block supplied thereto from the base block determination section 120. The motion vector calculation section 174 supplies the calculated motion vector to a signal line 103.

Now, setting of a base frame and a reference frame in the embodiment of the present invention is described.

[Example of Detection of a Motion, Vector]

Figure 2A:
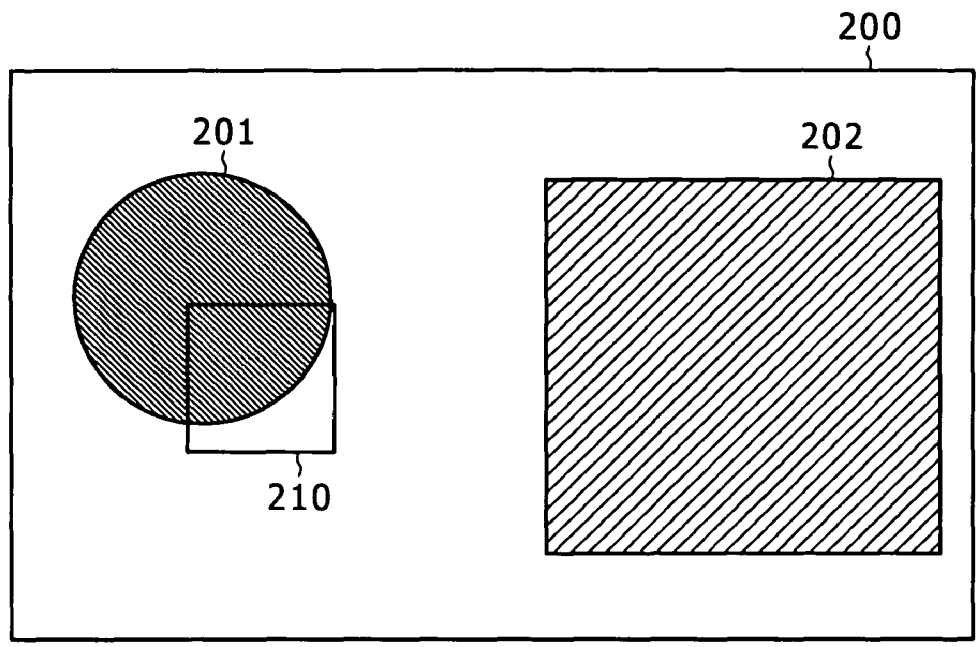
FIGS. 2A and 2B are schematic views illustrating an example of detection of a motion vector by the motion vector detection apparatus of FIG. 1 where same two moving objects are included in a base frame and a reference frame.
Figure 2B:
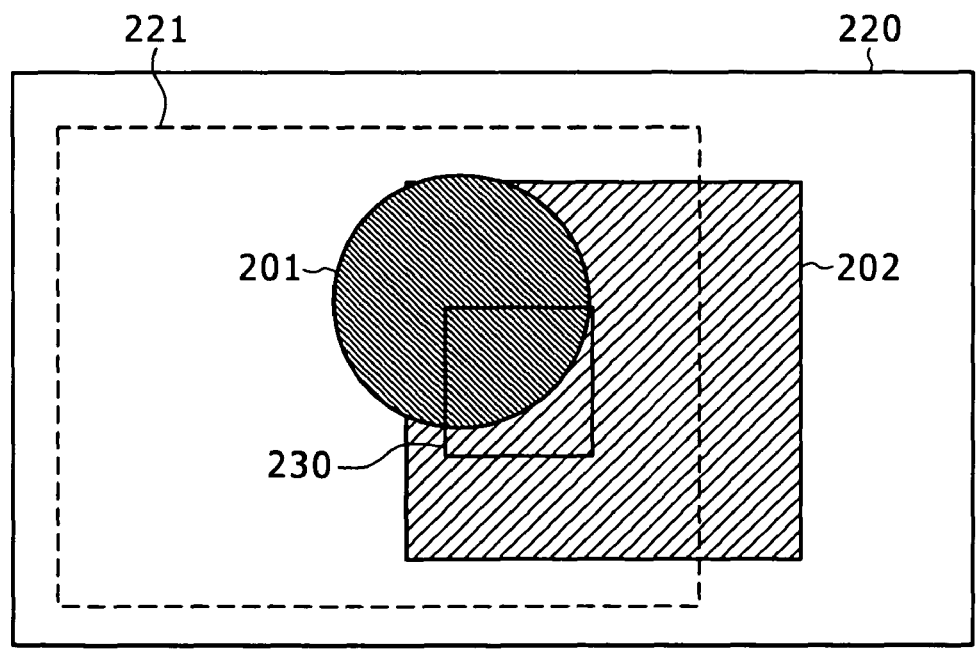

FIGS. 2A and 2B illustrate an example of detection of a motion vector where same two moving objects are included in a base frame and a reference frame by the motion vector detection apparatus 100 according to the first embodiment of the present invention. In particular, FIG. 2A illustrates a base frame 200 which is a current frame of a dynamic picture, and FIG. 2B illustrates a reference frame 220 which is a frame preceding by one frame to the base frame (in the case of forward reference).

The base frame 200 includes a moving body A 201, another moving body B 202 and a base block 210 displayed therein. The moving body A 201 and the moving body B 202 move in the frames as time passes. The base block 210 is a region determined by the base block determination section 120. The base block 210 includes a right lower portion of the moving body A 201 and a background image.

The reference frame 220 includes the moving body A 201 and the moving body B 202 included in the base frame 200, a search region 221 and a reference block 230 displayed thereon. The search region 221 is a region in which the source of movement of the base block 210 defined by the reference block determination section 140 is searched. The reference block 230 includes a right lower portion of the moving body A 201 and part of the moving body B 202.

In this instance, the motion vector detection apparatus 100 sets the effectiveness degree of the pixels corresponding to the moving body A 201 included in the base block 210 to a high level to make the correlation degree between the base block 210 and the reference block 230 highest. Consequently, the motion vector detection apparatus 100 can thereafter detect a motion vector of the moving body A 201 accurately.

[Example of Production of a Base Luminance Value]

FIGS. 3A and 3B illustrate an example of production of a base luminance value by the base luminance value production section 150 according to the first embodiment of the present invention.

FIG. 3A illustrates an example wherein the luminance value of a central pixel of the base block 210 where the number of pixels on each side of the base block 210 is "5." The base block 210 includes pixels #1 to #25 of the base block and a base pixel 211 positioned at the center of the base block 210 from among the pixels #1 to #25. A value indicated with parentheses in each of the pixels #1 to #25 is a luminance value of the pixel. Here, since the pixel #13 is the base pixel 211, "150" which is a luminance value of the pixel #13 is the base luminance value.

FIG. 3B illustrates an example wherein a statistical value of luminance values of pixels in the proximity of the center of a base block where the number of pixels on each side of the base block 210 is "4" is used as the base luminance value. Here, a base luminance value is produced from the pixels #7, #8, #12 and #13. For example, "151.5" which is an average value of the luminance values of the pixels #7, #8, #12 and #13 is determined as the base luminance.

In this manner, the base luminance value production section 150 produces a base luminance value based on the luminance values of all pixels of the base blocks from the base block determination section 120 or some of the pixels defined in advance and supplies the base luminance value to the effectiveness calculation section 160.

[Example of Calculation of an Effectiveness Degree]

FIG. 4 illustrates an example of calculation of an effectiveness degree by the effectiveness calculation section 160 according to the first embodiment of the present invention. Here, a classification technique of pixels wherein the effectiveness degree is set to a high value is described taking the base block 210 shown in FIG. 3A as an example. Further, the base luminance value $I_{base}$ is set to "150" and the threshold value $D_{th}$ is set to "20."

In this instance, the luminance value difference calculation section 161 calculates the difference absolute value D(i,j) between the luminance value $I_c(i,j)$ of each of the pixels #1 to #25 and the base luminance value $I_{base}$ supplied thereto from the base luminance value production section 150 in accordance with the expression (1) given hereinabove. Then, the weight calculation section 162 decides whether or not the difference absolute value D(i,j) of each of the pixels #1 to #25 is lower than the threshold value $D_{th}$.

In the present example, the pixels #1, #4 and #15 to #25 are decided as pixels having luminance values higher than the threshold value $D_{th}$ while the other pixels #2, #3 and #5 to #14 are decided as pixels having luminance values lower than the threshold value $D_{th}$.

In this manner, pixels whose effectiveness degree is set to a high value are distinguished based on the difference absolute value between the luminance value of each pixel of the base block and the base luminance value.

[Example of the Relationship between the Difference Absolute Value and the Weight]

Figure 5A:
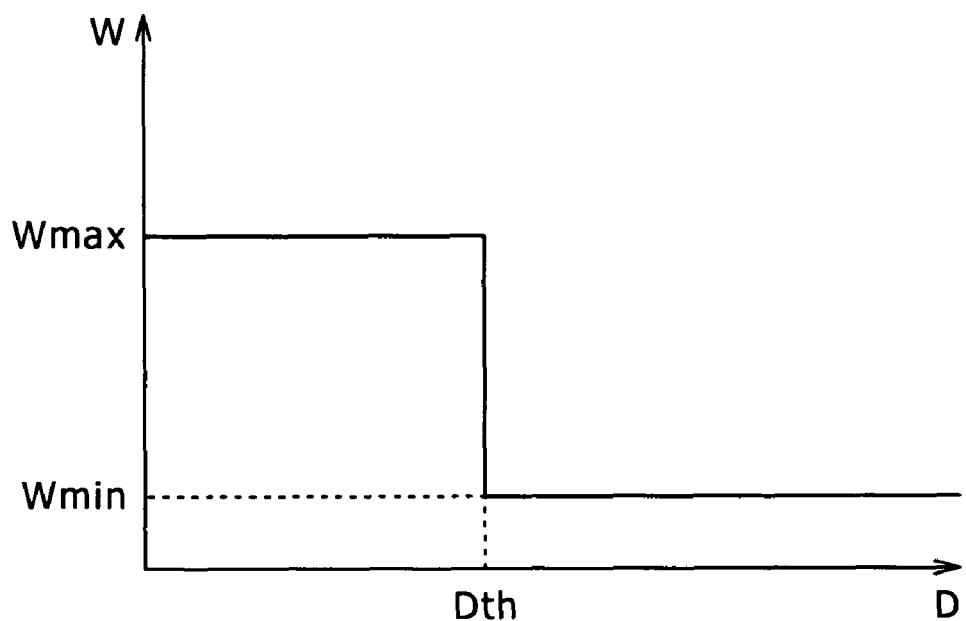
FIGS. 5A and 5B are diagrammatic views illustrating examples of a relationship between a difference absolute value calculated by a luminance value difference calculation section and a weight calculated by a weight calculation section of the motion vector detection apparatus of FIG. 1.
Figure 5B:
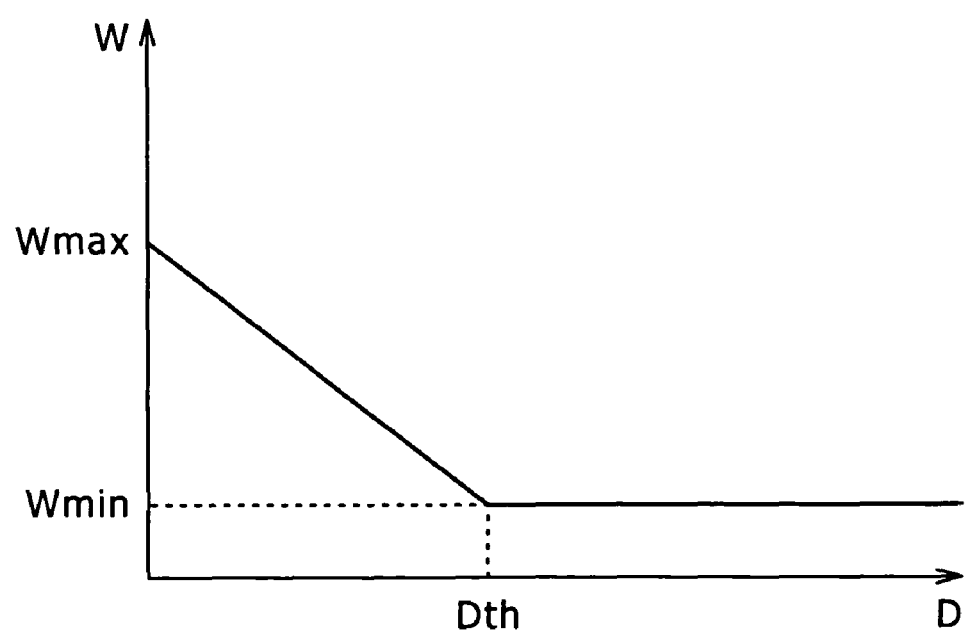

FIGS. 5A and 5B illustrate examples of a relationship between the difference absolute value calculated by the luminance value difference calculation section 161 and the weight calculated by the weight calculation section 162 according to the first embodiment of the present invention. In particular, FIGS. 5A and 5B show graphs wherein the axis of abscissa indicates the difference absolute value D and the axis of ordinate indicates the weight W.

More particularly, FIG. 5A illustrates an example wherein the difference absolute value D calculated by the luminance value difference calculation section 161 is lower than the threshold value $D_{th}$ and the weight W is a fixed value. Here, where the difference absolute value D(i,j) is lower than the threshold value $D_{th}$, the weight calculation section 162 supplies a value $W_{max}$ as the weight W(i,j) to the correlation calculation section 171. On the other hand, where the difference absolute value D(i,j) is higher than the threshold value $D_{th}$, another value $W_{min}$ lower than the value $W_{max}$ is supplied as the weight W(i,j) to the correlation calculation section 171. For example, the value $W_{max}$ and the value $W_{min}$ are set to "1" and "0," respectively.

In particular, the weight calculation section 162 calculates the weight W(i,j) of each pixel of the base block in accordance with the following expression:

$$W(i, j) = \begin{cases} W_{min} & \text{if } ((D(i, j) > D_{th}) \\ W_{max} & \text{else} \end{cases} \quad \text{expression 3}$$

where $W_{min}$ and $W_{max}$ are constants.

In this manner, a fixed weight is calculated for a pixel whose difference absolute value D is lower than the threshold value $D_{th}$. Consequently, in correlation degree calculation by the correlation calculation section 171, the effectiveness degree of each pixel of a base block with regard to which the difference absolute value of the luminance value from that of each pixel of the reference block is lower than the threshold value can be raised.

FIG. 5B illustrates an example wherein the weight W increases in inverse proportion to the difference absolute value D where the difference absolute value D calculated by the luminance value difference calculation section 161 is lower than the threshold value $D_{th}$. Here, where the difference absolute value D(i,j) is lower than the threshold value $D_{th}$, the weight W which increases in inverse proportion to the difference absolute value D is supplied as the weight W(i,j) from the weight calculation section 162 to the correlation calculation section 171. On the other hand, where the difference absolute value D(i,j) is higher than the threshold value $D_{th}$, the value Wmin which indicates the lowest value is supplied as the weight W(i,j) to the correlation calculation section 171.

In the present example, the weight calculation section 162 calculates the weight W(i,j) of each pixel of the base block in accordance with the following expression:

$$W(i, j) = \begin{cases} W_{min} & \text{if } (D(i, j) > D_{th}) \\ W_c(D_{th} - D(i, j)) + W_{min} & \text{else} \end{cases} \quad \text{expression 4}$$

where $W_{min}$ and $W_c$ are constants.

In this manner, for a pixel with regard to which the difference absolute value D is lower than the threshold value $D_{th}$, a weight which increases in inverse proportion to the difference absolute value D can be calculated. Consequently, in the correlation degree calculation by the correlation calculation section 171, the effectiveness degree can be set to a higher value as the difference absolute value between the luminance value of each pixel of the base block and the luminance value of each pixel in the reference block decreases.

[Example of Operation of the Motion Vector Detection Apparatus]

Now, operation of the motion vector detection apparatus 100 of the embodiment of the present invention is described with reference to the drawings.

Figure 6:
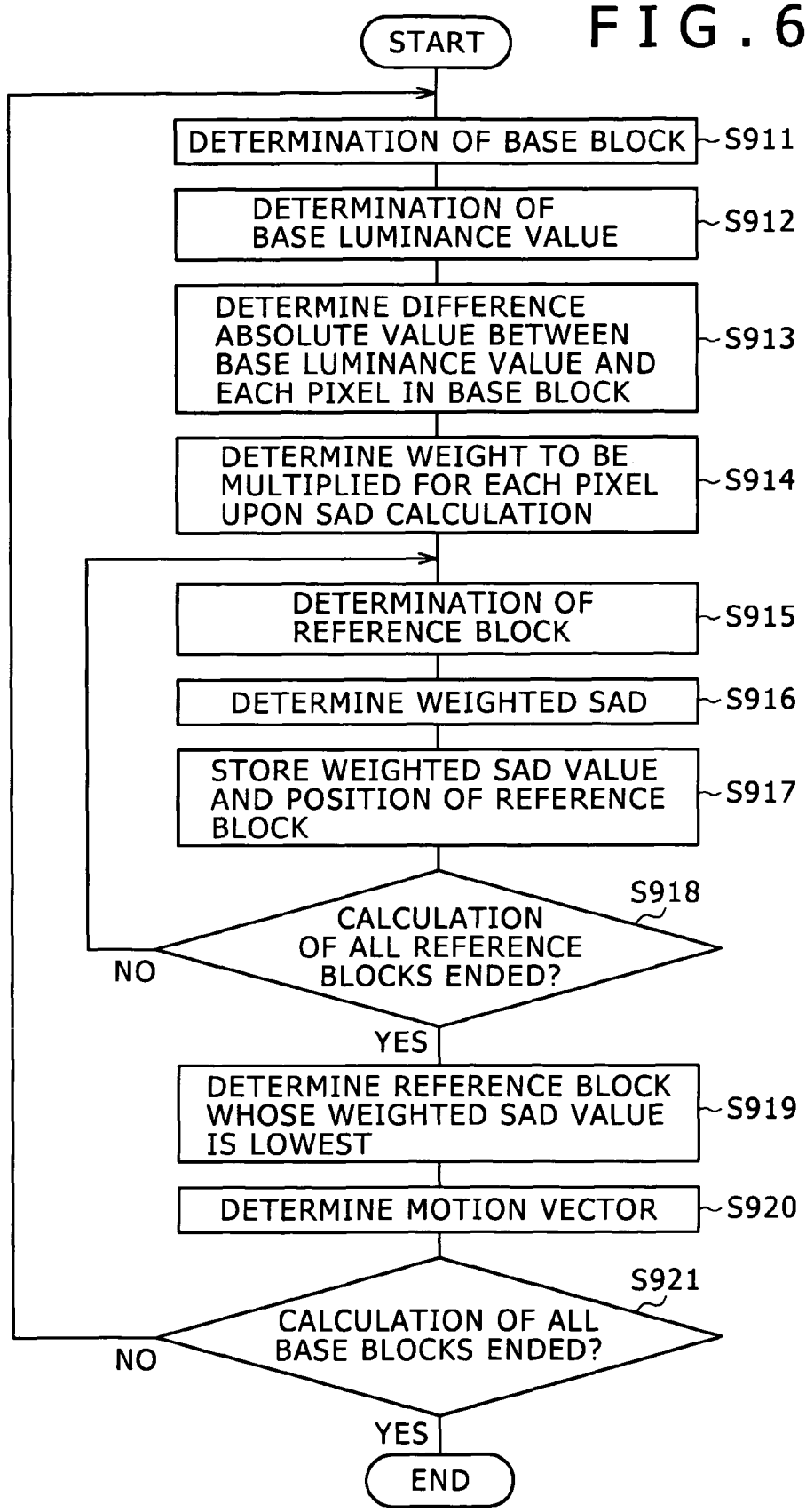
FIG. 6 is a flow chart illustrating a processing procedure of a motion vector calculation process by the motion vector detection apparatus of FIG. 1.

FIG. 6 illustrates an example of a processing procedure of a motion vector calculation process of the motion vector detection apparatus 100 according to the first embodiment of the present invention.

First, the base block determination section 120 determines a base block in a base frame from the base frame buffer 110 at step S911. Then, the base luminance value production section 150 produces a base luminance value based on luminance values of pixels of the entire base block from the base block determination section 120 or of part of the base block defined in advance at step S912. In other words, the process at step S912 is an example of a base luminance value production procedure. Then, the luminance value difference calculation section 161 calculates a difference absolute value between the base luminance value from the base luminance value production section 150 and the luminance value of each pixel of the base block at step S913. Then, the weight calculation section 162 calculates the weight for each pixel of the base block based on the base absolute value of each pixel of the base block from the luminance value difference calculation section 161 at step S914. In particular, the process at step S914 is an example of an effectiveness degree calculation procedure.

Then, the reference block determination section 140 determines a reference block in a reference frame from the reference frame buffer 130 at step S915. Then, the correlation calculation section 171 calculate a correlation degree between the base block and the reference block based on the weights for the pixels of the base block, the luminance values of the pixels of the base block and the luminance values of the pixels of the reference block at step S916. In particular, the process at step S916 is an example of a correlation degree calculation procedure.

Then, the correlation degree calculated by the correlation calculation section 171 and the position of the reference block are stored in an associated relationship with each other into the correlation map storage section 172 at step S917. Then, the position acquisition section 173 decides at step S918 whether or not the correlation degree and the position in regard to all reference blocks determined in a search range are stored in the correlation map storage section 172. Then, if the correlation degree and the position with regard to all reference blocks are not stored as yet, then the processing returns to step S915 so that the processes described above are repeated until the correlation degree and the position with regard to all reference blocks set in the search region are stored.

On the other hand, if the correlation degree and the position with regard to all reference blocks are stored, then the position of the reference block whose correlation degree is highest is acquired by the position acquisition section 173 at step S919. It is to be noted that the process at step S919 is an example of a position acquisition procedure. Then, the motion vector calculation section 174 calculates a motion vector based on the position of the reference block from the position acquisition section 173 and the position of the base block at step S920. It is to be noted that the process at step S920 is an example of a vector calculation procedure.

Then, it is decided at step S921 whether or not the motion vector is calculated with regard to all base blocks by the motion vector calculation section 174. Then, if the calculation of the motion vector is not completed with regard to all of the base blocks as yet, then the processing returns to step S911, at which a new base block is determined to thereafter carry out the processes at the steps beginning with step S912. On the other hand, if the motion vector is calculated with regard to all base blocks, then the motion vector calculation process is ended.

In this manner, with the first embodiment of the present invention, the effectiveness degree of each pixel of a base block calculated by the effectiveness calculation section 160 is reflected on the calculation of the correlation degree between the base block and a reference block. Therefore, the detection accuracy of a motion vector can be improved.

2. Second Embodiment

Figure 7:
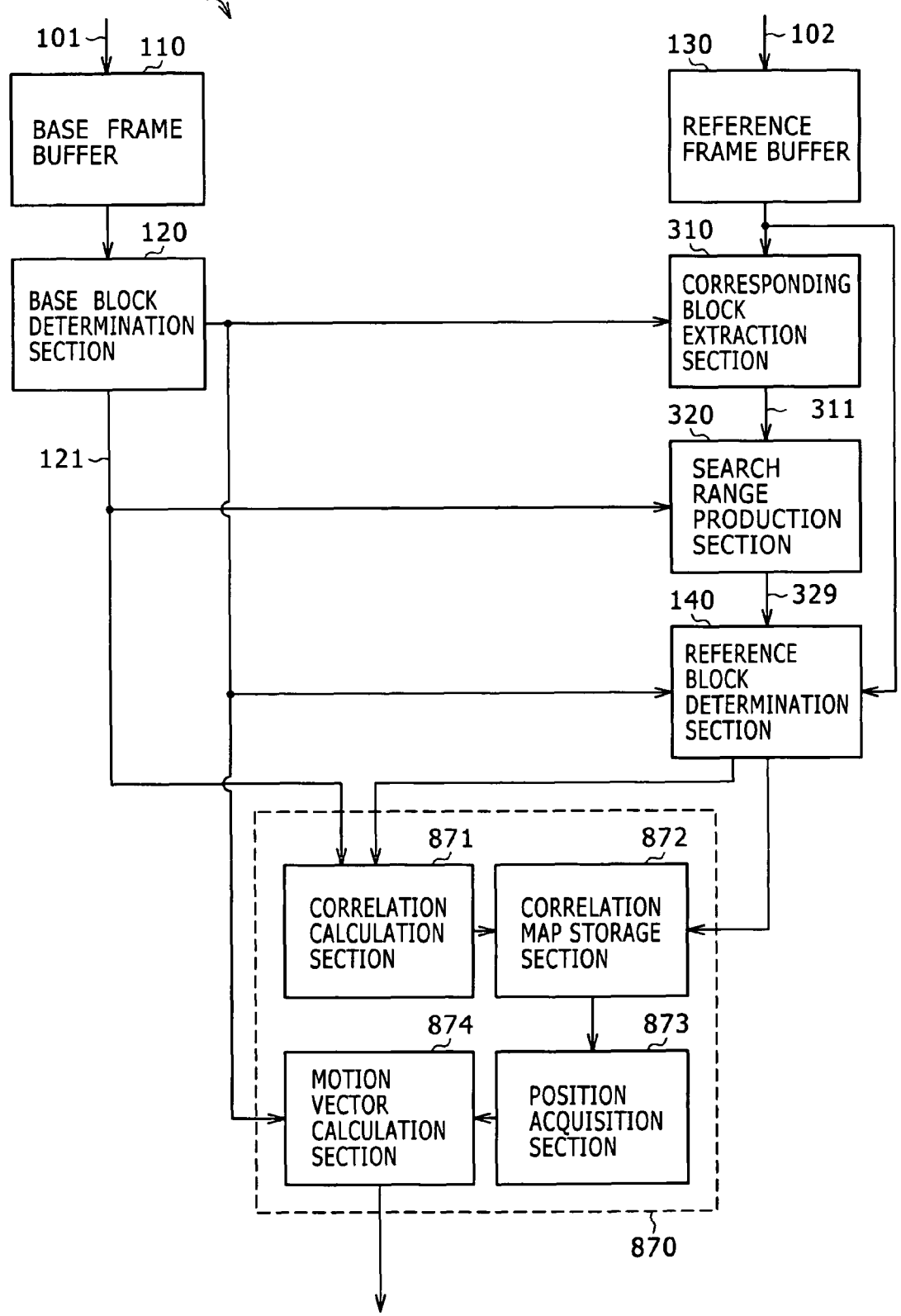
FIG. 7 is a block diagram showing a configuration of a motion vector detection apparatus according to a second embodiment of the present invention.

FIG. 7 shows a configuration of a motion vector detection apparatus according to a second embodiment of the present invention. Referring to FIG. 7, the motion vector detection apparatus 300 shown includes a corresponding block extraction section 310, a search range production section 320, a base frame buffer 110, a base block determination section 120, a reference frame buffer 130, a reference block determination section 140 and a block matching calculation section 870. The block matching calculation section 870 includes a correlation calculation section 871, a correlation map storage section 872, a position acquisition section 873 and a motion vector calculation section 874. Here, the base frame buffer 110, base block determination section 120 and reference frame buffer 130 are similar to those described hereinabove with reference to FIG. 1, and therefore, overlapping description of them is omitted herein to avoid redundancy.

The corresponding block extraction section 310 extracts a predetermined luminance value of a corresponding block in a reference frame which corresponds to the position of a base block. In particular, the corresponding block extraction section 310 sets a position of a corresponding block based on the position of a base block supplied thereto from the base block determination section 120. Then, the corresponding block extraction section 310 extracts, from among luminance values of pixels in the reference frame supplied thereto from the reference frame buffer 130, the luminance values of the pixels in the thus set corresponding block. Further, the corresponding block extraction section 310 supplies the extracted luminance values of the pixels in the corresponding blocks to the search range production section 320 through a signal line 311.

The search range production section 320 produces a search region in a reference frame for calculating a motion vector with respect to a base block based on a luminance value of a predetermined pixel in the corresponding block and the luminance value of a predetermined pixel in the base block. In particular, the search range production section 320 calculates the sum total of absolute values of spatial luminance differences which are luminance differences in a space between pixels with regard to a predetermined pixel in the base block supplied from the base block determination section 120. Further, the search range production section 320 calculates the sum total of absolute values of temporal luminance differences which are luminance differences on the time base between corresponding pixels of the base block from the base block determination section 120 and the corresponding block from the corresponding block extraction section 310. Then, the search range production section 320 calculates a search range of the reference frame based on the sum total of the absolute values of the spatial luminance differences and the sum total of the absolute values of the temporal luminance differences. Further, the search range production section 320 supplies the calculated search range of the reference frame to the reference block determination section 140 through a signal line 329.

The reference block determination section 140 defines a search region in the reference frame based on the position of the base block supplied from the base block determination section 120 and the search range supplied from the search range production section 320. Then, the reference block determination section 140 successively determines a reference block within the search range in such a manner as described hereinabove with reference to FIG. 1. Further, the reference block determination section 140 supplies the luminance value of the pixels in the determined reference block to the correlation calculation section 871 and stores the position of the reference block into the correlation map storage section 872.

The block matching calculation section 870 carries out block matching based on the correlation degree between the reference block and the base block to calculate a motion vector of the reference block. The correlation calculation section 871 calculates, for each reference block, as the correlation degree, a SAD which is the sum total of absolute values of luminance differences between corresponding pixels of the base block from the base block determination section 120 and the reference block from the reference block determination section 140. The correlation calculation section 871 stores the correlation degree calculated for each reference block into the correlation map storage section 872.

The correlation map storage section 872 temporarily stores the correlation degree of the reference block supplied from the correlation calculation section 871 and the position of the reference block supplied from the reference block determination section 140 in an associated relationship with each other. The correlation map storage section 872 supplies the correlation degrees and positions of all of the reference blocks stored therein to the position acquisition section 873.

The position acquisition section 873 acquires the position of that one of all reference blocks supplied thereto from the correlation map storage section 872 which exhibits the highest correlation degree. In particular, when the correlation and the position with regard to all reference blocks are stored in the correlation map storage section 872, the position acquisition section 873 acquires the position of the reference block which exhibits the highest correlation. Further, the position acquisition section 873 supplies the acquired position of the reference block to the motion vector calculation section 874.

The motion vector calculation section 874 calculates a motion vector based on the position of the reference vector supplied thereto from the position acquisition section 873 and having the highest correlation degree and the position of the base block supplied from the base block determination section 120.

Here, an example of a search region in a reference frame defined based on the search range produced by the search range production section 320 and the position of the base block is described with reference to the accompanying drawings.

[Example of Definition of a Search Region]

Figure 8:
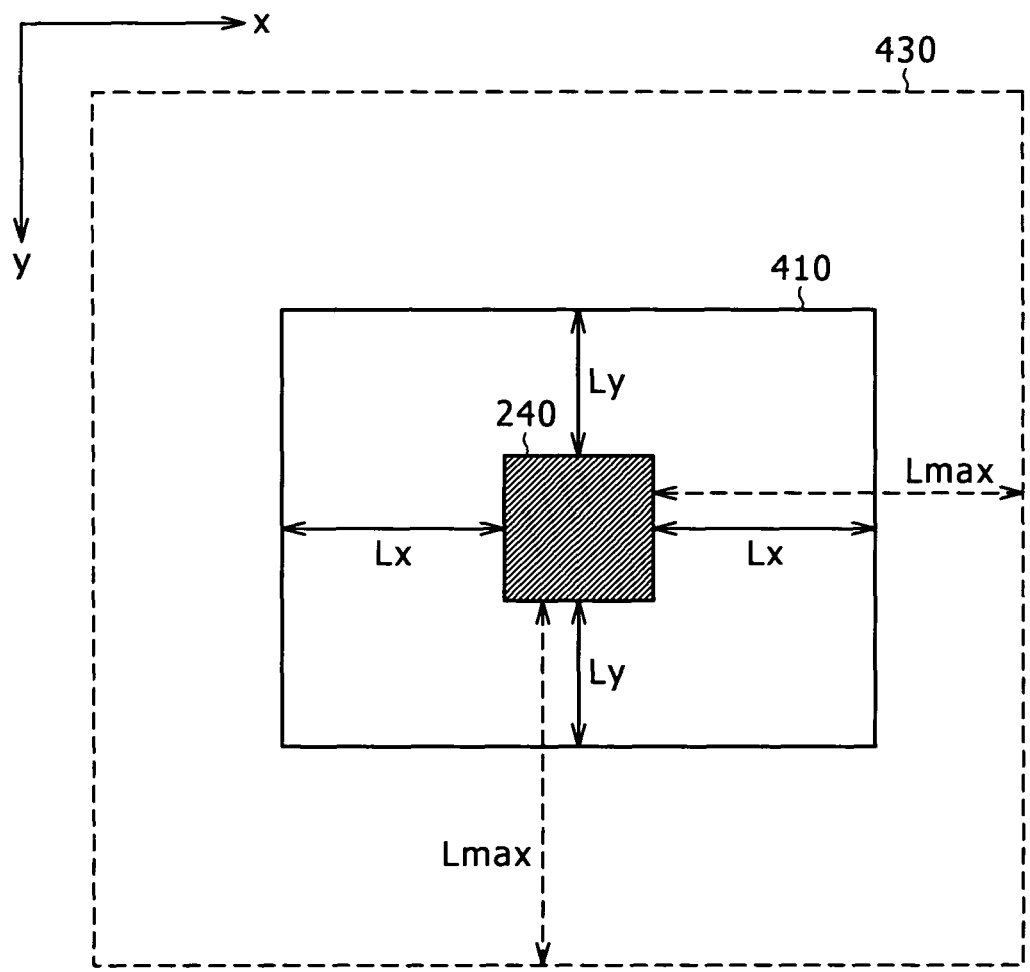
FIG. 8 is a diagrammatic view illustrating an example of a search region of a reference frame defined by the motion vector detection apparatus of FIG. 7.

FIG. 8 shows an example of a search region in a reference frame defined by the motion vector detection apparatus 100 according to the second embodiment of the present invention. Referring to FIG. 8, a search region 410 and a maximum search region 430 in the reference frame are shown. Here, the horizontal direction and the vertical direction of the base block are defined as an x direction and a y direction, respectively.

The search region 410 is a region defined by a search range $L_x$ in the x direction and a search range $L_y$ in the y direction produced by the search range production section 320 and a search region base block 240. The search region base block 240 is a block at a position same as the position of a base block in the reference frame. In particular, the search region base block 240 is set to a position at which the motion vector with respect to the base block is "0."

The search range $L_x$ in the x direction indicates a maximum range within which the reference block can be moved to the right side and the left side in the x direction with reference to the base block 210. The search range $L_y$ in the y direction indicates a maximum range within which the reference block can be moved to the upper side and the lower side in the y direction with reference to the search region base block 240.

The maximum search region 430 is a region defined based on the maximum search range $L_{max}$ and the search region base block 240. The maximum search range $L_{max}$ is determined based on the resolution and compression ratio of an image and is set, for example, to 32 pixels.

Since the search range production section 320 produces the search range $L_x$ in the x direction and the search range $L_y$ in the y direction in this manner, the motion vector detection apparatus 300 can define the search ranges in the x direction and the y direction independently of each other within the search region. Further, the motion vector detection apparatus 300 can prevent expansion of the search region exceeding the defined maximum region by providing the maximum search range $L_{max}$. Now, examples of a configuration of the search range production section 320 which produces the search range $L_x$ in the x direction and the search range $L_y$ in the y direction are described with reference to FIG. 9.

[First Example of a Configuration of the Search Range Production Section]

Figure 9:
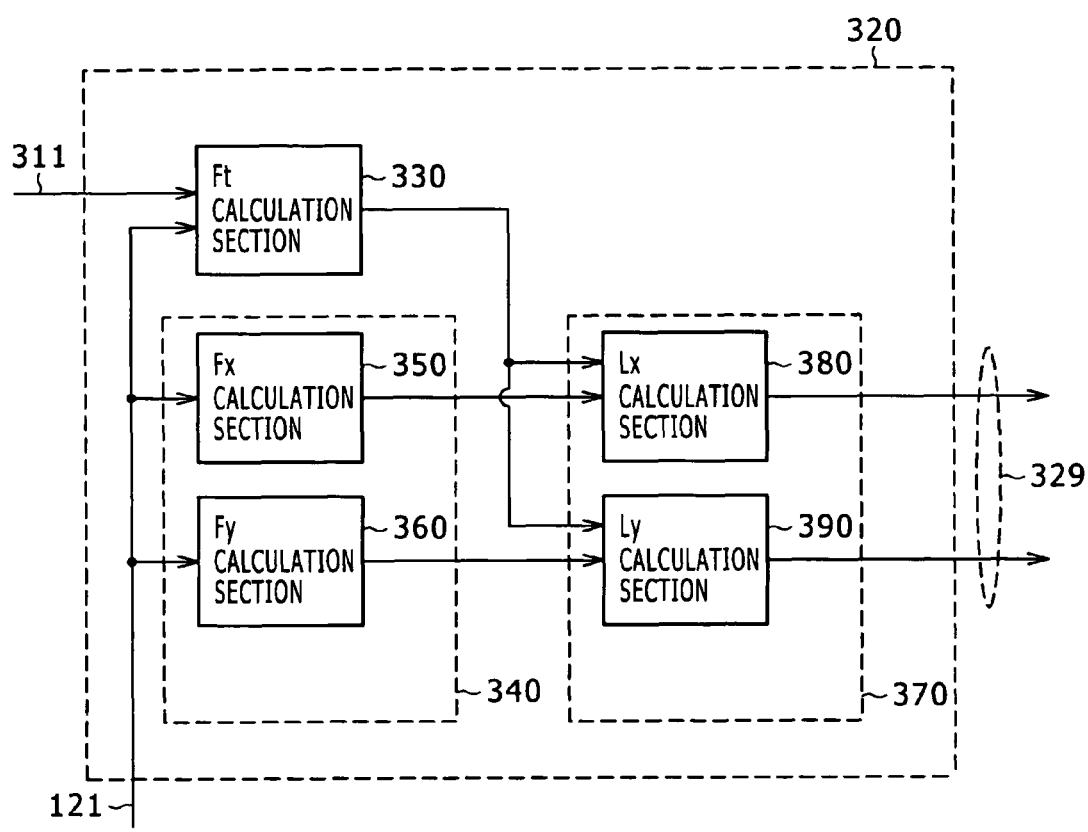
FIG. 9 is a block diagram showing a first example of a configuration of a search range production section of the motion vector detection apparatus of FIG. 7.

FIG. 9 shows a first example of a configuration of the search range production section 320 in the second embodiment of the present invention. Referring to FIG. 9, the search range production section 320 includes an $F_t$ calculation section 330, an $F_s$ calculation section 340 and an L calculation section 370.

The $F_t$ calculation section 330 calculates the sum total of temporal luminance differences, which are luminance differences between corresponding pixels in a corresponding block supplied from the signal line 311 and a base block supplied from a signal line 121, as a temporal luminance difference sum total $F_t$. The $F_t$ calculation section 330 calculates the temporal luminance difference sum total $F_t$ in accordance with the following expression and supplies the calculated temporal luminance difference sum total $F_t$ to the L calculation section 370.

$$F_t = \sum_{i=0,j=0}^{N,N} |I_t(i,j)| = \sum_{i=0,j=0}^{N,N} |I_c(i,j) - I_r(i,j)| \quad \text{expression 5}$$

where $I_t(i,j)$ is a temporal luminance difference, $I_c(i,j)$ a luminance value of a pixel in the base block, $I_r(i,j)$ a luminance value of a pixel in the reference block, i and j are a pixel position in the x direction and a pixel position in the y direction of each block, respectively, and N is a value obtained by subtracting "1" from the number of pixels in the different pixels in each block.

In this manner, as the speed at which a moving body moves increases, the difference in position between a moving body included in the base block and the same moving body included in the corresponding block, and consequently, the temporal luminance difference sum total $F_t$ calculated in accordance with the expression given above is likely to have a high value. On the other hand, since the difference in position of a moving body between the base block and the corresponding block decreases as the speed at which the moving body moves decreases, the temporal luminance difference sum total $F_t$ is likely to become low. From this, the speed of a moving body included in the base block can be estimated.

The $F_s$ calculation section 340 calculates the sum total of absolute values of spatial luminance differences which are luminance differences between adjacent pixels to pixels in the base block supplied from the signal line 121 as a spatial luminance difference sum total.

The $F_s$ calculation section 340 includes an $F_x$ calculation section 350 and an $F_y$ calculation section 360. The $F_x$ calculation section 350 calculates the sum total of absolute values of spatial luminance differences in the horizontal direction with regard to the pixels in the base block as a spatial luminance difference sum total in the x direction. In particular, the $F_x$ calculation section 350 calculates the sum total of luminance differences between adjacent pixels in the x direction to the pixels in the base block as a spatial luminance difference sum total $F_x$ in the x direction. The spatial luminance difference sum total $F_x$ in the x direction is a value representative of a component of the spatial luminance difference sum total $F_s$ in the x direction. The $F_x$ calculation section 350 supplies the calculated spatial luminance difference sum total $F_x$ in the x direction to an $L_x$ calculation section 380.

The $F_y$ calculation section 360 calculates the sum total of absolute values of spatial luminance differences in the vertical direction with regard to the pixels in the base block as a spatial luminance difference sum total in the y direction. In particular, the $F_y$ calculation section 360 calculates the sum total of luminance differences between adjacent pixels in the y direction to the pixels in the base block as a spatial luminance difference sum total $F_y$ in the y direction. The spatial luminance difference sum total $F_y$ in the y direction is a value representative of a component of the spatial luminance difference sum total $F_s$ in the y direction. The $F_y$ calculation section 360 supplies the calculated spatial luminance difference sum total $F_y$ in the y direction to the $L_x$ calculation section 390.

The spatial luminance difference sum total $F_x$ in the x direction and the spatial luminance difference sum total $F_y$ in the y direction described above can be presented by the following expression:

$$F_s = \begin{pmatrix} F_x \\ F_y \end{pmatrix} \quad \text{expression 6}$$

$$= \begin{pmatrix} \sum_{i=0,j=0}^{N,N} |I_x(i,j)| \\ \sum_{i=0,j=0}^{N,N} |I_y(i,j)| \end{pmatrix}$$

$$= \begin{pmatrix} \sum_{i=0,j=0}^{N,N} |I_c(i+1,j) - I_c(i,j)| \\ \sum_{i=0,j=0}^{N,N} |I_c(i,j+1) - I_c(i,j)| \end{pmatrix}$$

where $I_x(i,j)$ is a spatial luminance difference in the x direction with regard to each pixel in the base block, and $I_y(i,j)$ is a spatial luminance difference in the y direction with regard to each pixel in the base block.

As the speed at which the moving body moves increases, the image of the moving body included in the base block comes to have an increasing amount of blurring, and therefore, the spatial luminance difference sum total $F_s$ calculated in accordance with the expression given above is likely to have a low value. On the other hand, as the speed at which the moving body moves decreases, the image of the moving body included in the base block comes to have a decreasing amount of blurring, and therefore, the spatial luminance difference sum total $F_s$ is likely to have a high value. Consequently, the speed of the moving body included in the base block can be estimated.

The L calculation section 370 calculates a search range in the reference frame for searching for a motion vector with respect to the base block based on the temporal luminance difference sum total $F_t$ from the $F_t$ calculation section 330 and the spatial luminance difference sum total $F_s$ from the $F_s$ calculation section 340. This L calculation section 370 sets a decreasing search range in the reference frame as the spatial luminance difference sum total $F_s$ increases and sets an increasing search range in the reference frame as the temporal luminance difference sum total $F_t$ increases. In other words, the L calculation section 370 calculates the search range which increases in inverse proportion to the spatial luminance difference sum total $F_s$ but increases in proportion to the temporal luminance difference sum total $F_t$. Then, the L calculation section 370 calculates one of the search range calculated in this manner and a predetermined range as a search range in the reference frame. In particular, the L calculation section 370 calculates the search range L based on the following function G:

$$L = G(F_t, F_s) = \min\left(\alpha \frac{F_t}{F_s}, L_{max}\right) \quad \text{expression 7}$$

where $L_{max}$ is a maximum search range illustrated in FIG. 8, and $\alpha$ is a fixed value and is set, for example, to "1." From the expression above, the search range becomes small if $\alpha$ is set to a low value, and therefore, the processing amount by block matching can be suppressed.

The L calculation section 370 supplies the calculated search range L to the reference block determination section 140 through the signal line 329.

The L calculation section 370 includes an $L_x$ calculation section 380 and an $L_y$ calculation section 390. The $L_x$ calculation section 380 calculates the search range $L_x$ in the x direction illustrated in FIG. 8. In particular, the $L_x$ calculation section 380 calculates the search range $L_x$ in the x direction based on the temporal luminance difference sum total $F_t$ from the $F_t$ calculation section 330 and the spatial luminance difference sum total $F_x$ in the x direction from the $F_x$ calculation section 350. The $L_x$ calculation section 380 supplies the calculated search range $L_x$ in the x direction to the reference block determination section 140 through the signal line 329.

The $L_y$ calculation section 390 calculates the search range $L_y$ in the y direction illustrated in FIG. 8. In particular, the $L_y$ calculation section 390 calculates the search range $L_y$ in the y direction based on the temporal luminance difference sum total $F_t$ from the $F_t$ calculation section 330 and the spatial luminance difference sum total $F_y$ in the y direction from the $F_y$ calculation section 360. The $L_y$ calculation section 390 supplies the calculated search range $L_y$ in the y direction to the reference block determination section 140 through the signal line 329.

Here, as an example for calculation of the search range $L_x$ in the x direction and the search range $L_y$ in the y direction described above, the following expression can be applied:

$$\begin{pmatrix} L_x \\ L_y \end{pmatrix} = \begin{pmatrix} G(F_t, F_x) \\ G(F_t, F_y) \end{pmatrix} \quad \text{expression 8}$$

Since the range of movement of a moving body included in the base block can be estimated using two parameters of the temporal luminance difference sum total $F_t$ and the spatial luminance difference sum total $F_s$ in this manner, a search region in a reference frame can be defined with a high degree of accuracy. Further, by calculating the search ranges in the x direction and the y direction separately from each other, an optimum search range can be defined. It is to be noted here that, while the search ranges in the x direction and the y direction described above are produced symmetrically, an example wherein search ranges in upward and downward directions and in leftward and rightward directions are produced separately with regard to the search region base block 240 is described below.

[Example of Definition of the Search Range]

Figure 10:
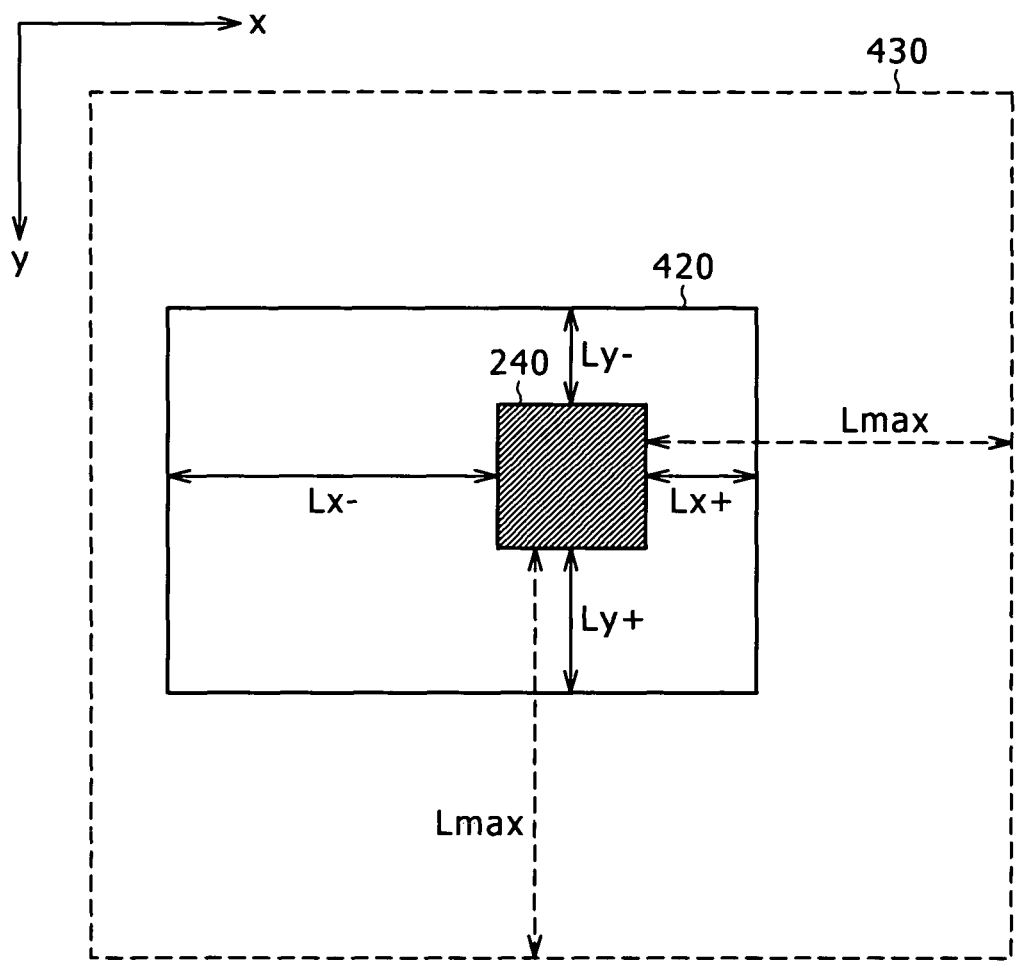
FIG. 10 is a diagrammatic view illustrating an example of a search range of a reference frame defined asymmetrically by the motion vector detection apparatus of FIG. 7.

FIG. 10 illustrates an example of a search region in a reference frame defined asymmetrically by the motion vector detection apparatus 300 in the second embodiment of the present invention. In FIG. 10, a search region 420 and a maximum search region 430 in a reference frame are illustrated. Incidentally, the components except the search region 420 in a reference frame are similar to those described hereinabove with reference to FIG. 8, and therefore, overlapping description of them is omitted herein to avoid redundancy.

The search region 420 is a region defined by the search region base block 240, a search range $L_x^+$ on the positive side and a search range $L_x^-$ on the negative side in the x direction and a search range $L_y^+$ on the positive side and a search range $L_y^-$ on the negative side in the y direction. The search range $L_x^+$ on the positive side and the search range $L_x^-$ on the negative side in the x direction and the search range $L_y^+$ on the positive side and the search range $L_y^-$ on the negative side in the y direction are produced by the search range production section 320.

The search range $L_x^+$ on the positive side in the x direction indicates a maximum range within which the reference block can be moved to the right side in the x direction with reference to the search region base block 240. The search range $L_x^-$ on the negative side in the x direction indicates a maximum range within which the reference block can be moved to the left side in the x direction with reference to the search region base block 240.

The search range $L_y^+$ on the positive side in the y direction indicates a maximum range within which the reference block can be moved to the lower side in the y direction with reference to the search region base block 240. The search range $L_y^-$ on the negative side in the y direction indicates a maximum range within which the reference block can be moved to the upper side in the y direction with reference to the search region base block 240.

By producing the positive and negative side search ranges in the different directions individually by means of the search range production section 320 in this manner, a search region is defined asymmetrically with reference to the search region base block 240 in the individual directions. Now, an example of a configuration of the search range production section 320 where a search region is defined asymmetrically is described below.

[Second Example of a Configuration of the Search Range Production Section]

Figure 11:
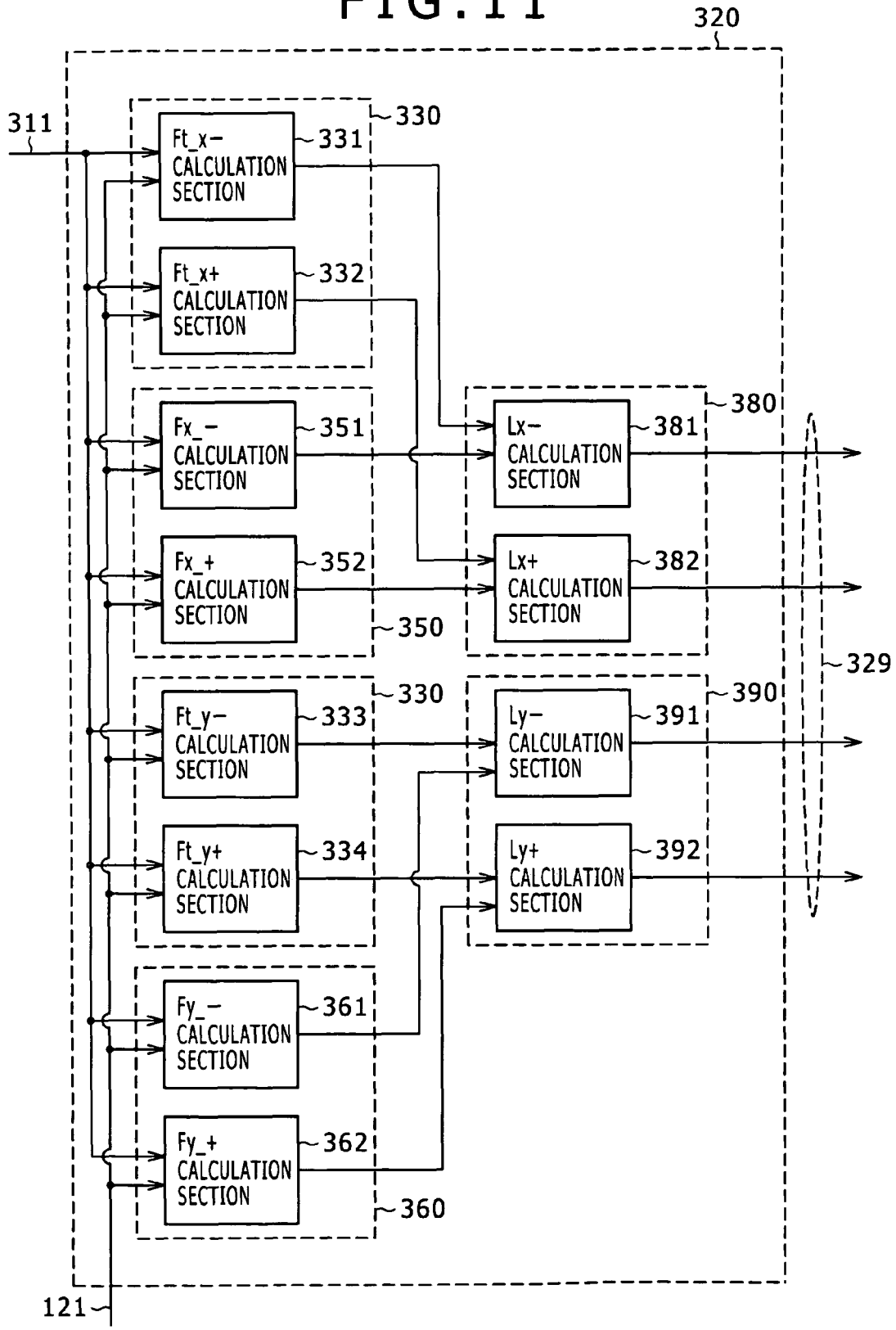
FIG. 11 is a block diagram showing a second example of a configuration of the search range production section of the motion vector detection apparatus of FIG. 7 where the search range is set asymmetrically.

FIG. 11 shows a second example of a configuration of the search range production section 320 where a search range is produced asymmetrically according to the second embodiment of the present invention. Referring to FIG. 11, the search range production section 320 includes an $F_t$ calculation section 330, an $F_x$ calculation section 350, an $F_y$ calculation section 360, an $L_x$ calculation section 380 and an $L_y$ calculation section 390.

The $F_t$ calculation section 330 includes an $F_t^{x-}$ calculation section 331, an $F_t^{x+}$ calculation section 332, an $F_t^{y-}$ calculation section 333 and an $F_t^{y+}$ calculation section 334. The $F_x$ calculation section 350 includes an $F_x^{-}$ calculation section 351 and an $F_x^{+}$ calculation section 352. The $F_y$ calculation section 360 includes an $F_y^{-}$ calculation section 361 and an $F_y^{+}$ calculation section 362. The $L_x$ calculation section 380 includes an $L_x^{-}$ calculation section 381 and an $L_x^{+}$ calculation section 382. The $L_y$ calculation section 390 includes an $L_y^{-}$ calculation section 391 and an $L_y^{+}$ calculation section 392.

The $F_t$ calculation section 330 adds absolute values of temporal luminance differences in both of the x direction and the y direction to one of the positive side temporal luminance difference sum totals and the negative side temporal luminance difference sum totals in the different directions. In particular, the $F_t$ calculation section 330 adds the absolute values of the temporal luminance differences in the different directions with regard to a predetermined pixel in the base block based on the sign of the temporal luminance difference with regard to the predetermined pixel in the base block and the sign of the spatial luminance differences in the different directions.

The $F_t^{x-}$ calculation section 331 adds the absolute values of the temporal luminance differences in the x direction with regard to the pixels in the base block to the negative side temporal luminance difference sum total $F_t^{x-}$ in the x direction based on the sign of the temporal luminance difference and the sign of the spatial luminance difference in the x direction with regard to the pixels. The $F_t^{x+}$ calculation section 331 supplies the calculated negative side temporal luminance difference sum total $F_t^{x-}$ in the x direction to the $L_x^{-}$ calculation section 381.

The $F_t^{x+}$ calculation section 332 adds the absolute values of the temporal luminance differences in the x direction with regard to the pixels in the base block to the positive side temporal luminance difference sum total $F_t^{x+}$ in the x direction based on the sign of the temporal luminance difference and the sign of the spatial luminance difference in the x direction with regard to the pixels. The $F_t^{x+}$ calculation section 332 supplies the calculated positive side temporal luminance difference sum total $F_t^{x+}$ in the x direction to the $L_x^{+}$ calculation section 382.

The $F_t^{y-}$ calculation section 333 adds the absolute values of the temporal luminance differences in the y direction with regard to the pixels in the base block to the negative side temporal luminance difference sum total $F_t^{y-}$ in the y direction based on the sign of the temporal luminance difference and the sign of the spatial luminance difference in the y direction with regard to the pixels. The $F_t^{y-}$ calculation section 333 supplies the calculated negative side temporal luminance difference sum total $F_t^{y-}$ in the y direction to the $L_y^{-}$ calculation section 391.

The $F_t^{y+}$ calculation section 334 adds the absolute values of the spatial luminance differences in the y direction with regard to the pixels in the base block to the positive side temporal luminance difference sum total $F_t^{y+}$ in the y direction based on the sign of the temporal luminance difference and the sign of the spatial luminance difference in the y direction with regard to the pixels. The $F_t^{y+}$ calculation section 334 supplies the calculated positive side temporal luminance difference sum total $F_t^{y+}$ in the y direction to the $L_y^{+}$ calculation section 392.

Here, for calculation of the negative side temporal luminance difference sum total $F_t^{x-}$ in the x direction, positive side temporal luminance difference sum total $F_t^{x+}$ in the x direction, negative side temporal luminance difference sum total $F_t^{y-}$ in the y direction and positive side temporal luminance difference sum total $F_t^{y+}$ in the y direction, the following expression can be used:

$$\begin{pmatrix} F_t^{x-} & F_t^{x+} \\ F_t^{y-} & F_t^{y+} \end{pmatrix} = \begin{pmatrix} \sum_{i=0,j=0}^{N,N} |I_t^{x-}(i,j)| & \sum_{i=0,j=0}^{N,N} |I_t^{x+}(i,j)| \\ \sum_{i=0,j=0}^{N,N} |I_t^{y-}(i,j)| & \sum_{i=0,j=0}^{N,N} |I_t^{y+}(i,j)| \end{pmatrix} \quad \text{expression 9}$$

where $I_t^{x-}(i,j)$, $I_t^{x+}(i,j)$, $I_t^{y-}(i,j)$ and $I_t^{y+}(i,j)$ can be represented by the following expressions:

$$(I_t^{x-}(i,j) \quad I_t^{x+}(i,j)) = \begin{cases} (I_t(i,j) \quad 0) & \text{if } (-I_x I_t < 0) \\ (0 \quad I_t(i,j)) & \text{else} \end{cases} \quad \text{expression 10}$$

$$(I_t^{y-}(i,j) \quad I_t^{y+}(i,j)) = \begin{cases} (I_t(i,j) \quad 0) & \text{if } (-I_y I_t < 0) \\ (0 \quad I_t(i,j)) & \text{else} \end{cases}$$

In this manner, the $F_t$ calculation section 330 uses the direction of the speed of a moving body estimated based on the sign of the spatial luminance difference and the sign of the temporal luminance difference with regard to each pixel in the base block to calculate the sum total of absolute values of temporal luminance differences on the positive side and the negative side in the directions.

The $F_x$ calculation section 350 adds the absolute value of the spatial luminance difference in the x direction with regard to a predetermined pixel in the base block to one of the positive side temporal luminance difference sum total and the negative side temporal luminance difference sum total in the x direction. In particular, the $F_x$ calculation section 350 adds the spatial luminance difference in the x direction with regard to the predetermined pixel in the base block based on the sign of the temporal luminance difference with regard to the predetermined pixel and the sign of the spatial luminance difference in the different directions.

The $F_x^{-}$ calculation section 351 adds the absolute value of the spatial luminance difference in the x direction with regard to each pixel in the base block to the negative side spatial luminance difference sum total $F_x^{-}$ in the x direction based on the sign of the temporal luminance difference with regard to the pixel and the sign of the spatial luminance difference in the x direction. The $F_x^{-}$ calculation section 351 supplies the calculated negative side spatial luminance difference sum total $F_x^{-}$ in the x direction to the $L_x^{-}$ calculation section 381.

The $F_x^{+}$ calculation section 352 adds the absolute value of the spatial luminance difference in the x direction with regard to each pixel in the base block to the positive side spatial luminance difference sum total $F_x^{+}$ in the x direction based on the code of the temporal luminance difference with regard to the pixel and the sign of the spatial luminance difference in the x direction. The $F_x^{+}$ calculation section 352 supplies the calculated positive side spatial luminance difference sum total $F_x^{+}$ in the x direction to the $L_x^{+}$ calculation section 382.

The $F_y$ calculation section 360 adds the absolute value of the spatial luminance difference in the y direction with regard to a predetermined pixel in the base block to one of the positive side spatial luminance difference sum total and the negative side spatial luminance difference sum total in the y direction. In particular, the $F_y$ calculation section 360 adds the spatial luminance difference in the y direction with regard to the predetermined pixel in the base block based on the sign of the temporal luminance difference with regard to the predetermined pixel and the sign of the spatial luminance difference in the different directions.

The $F_y^-$ calculation section 361 adds the absolute value of the spatial luminance difference in the y direction with regard to each pixel in the base block to the negative side spatial luminance difference sum total $F_y^-$ in the y direction based on the sign of the temporal luminance difference with regard to the pixel and the sign of the spatial luminance difference in the y direction. The $F_y^-$ calculation section 361 supplies the calculated negative side spatial luminance difference sum total $F_y^-$ in the y direction to the $L_y^-$ calculation section 391.

The $F_y^+$ calculation section 362 adds the absolute value of the spatial luminance difference in the y direction with regard to each pixel in the base block to the positive side spatial luminance difference sum total $F_y^+$ in the y direction based on the sign of the temporal luminance difference with regard to the pixel and the sign of the spatial luminance difference in the y direction. The $F_y^+$ calculation section 362 supplies the calculated positive side spatial luminance difference sum total $F_y^+$ in the y direction to the $L_y^+$ calculation section 392.

The negative side spatial luminance difference sum total $F_x^-$ in the x direction, positive side spatial luminance difference sum total $F_x^+$ in the x direction, negative side spatial luminance difference sum total $F_y^-$ in the y direction and positive side spatial luminance difference sum total $F_y^+$ in the y direction can be calculated in accordance with the following expression:

$$\begin{pmatrix} F_x^- & F_x^+ \\ F_y^- & F_y^+ \end{pmatrix} = \begin{pmatrix} \sum_{i=0,j=0}^{N,N} |I_x^-(i,j)| & \sum_{i=0,j=0}^{N,N} |I_x^+(i,j)| \\ \sum_{i=0,j=0}^{N,N} |I_y^-(i,j)| & \sum_{i=0,j=0}^{N,N} |I_y^+(i,j)| \end{pmatrix} \quad \text{expression 11}$$

where $I_x^-(i,j)$, $I_x^+(i,j)$ $I_y^-(i,j)$ and $I_y^+(i,j)$ can be represented by the following expressions:

$$(I_x^-(i,j) \quad I_x^+(i,j)) = \begin{cases} (I_x(i,j) \quad 0) & \text{if } (-I_x I_t < 0) \\ (0 \quad I_x(i,j)) & \text{else} \end{cases} \quad \text{expression 12}$$

$$(I_y^-(i,j) \quad I_y^+(i,j)) = \begin{cases} (I_y(i,j) \quad 0) & \text{if } (-I_y I_t < 0) \\ (0 \quad I_y(i,j)) & \text{else} \end{cases}$$

In this manner, the $F_x$ calculation section 350 and the $F_y$ calculation section 360 use the direction of the speed of a moving body estimated based on the sign of the spatial luminance difference and the sign of the temporal luminance difference with regard to each pixel in the base block to calculate the sum total of absolute values of the spatial luminance differences on the positive side and the negative side.

The $L_x$ calculation section 380 calculates the search range $L_x^-$ on the negative side and the search range $L_x^+$ on the positive side in the x direction. The $L_x^-$ calculation section 381 calculates the search range $L_x^-$ on the negative side in the x direction based on the negative side spatial luminance difference sum total $F_x^-$ in the x direction and the negative side temporal luminance difference sum total $F_t^{x-}$ in the x direction. The $L_x^-$ calculation section 381 supplies the calculated search range $L_x^-$ on the negative side in the x direction to the reference block determination section 140 through the signal line 329.

The $L_x^+$ calculation section 382 calculates the search range $L_x^+$ on the positive side in the x direction based on the positive side spatial luminance difference sum total $F_x^+$ in the x direction and the positive side temporal luminance difference sum total $F_t^{x+}$ in the x direction. The $L_x^+$ calculation section 382 supplies the calculated search range $L_x^+$ on the positive side in the x direction to the reference block determination section 140 through the signal line 329.

The $L_y$ calculation section 390 calculates the search range $L_y^-$ on the negative side and the search range $L_y^+$ on the positive side in the y direction. The $L_y^-$ calculation section 391 calculates the search range $L_y^-$ on the negative side in the y direction based on the negative side spatial luminance difference sum total $F_y^-$ in the y direction and the negative side temporal luminance difference sum total $F_t^{y-}$ in the y direction. The $L_y^-$ calculation section 391 supplies the calculated search range $L_y^-$ on the negative side in the y direction to the reference block determination section 140 through the signal line 329.

The $L_y^+$ calculation section 392 calculates the search range $L_y^+$ on the positive side in the y direction based on the positive side spatial luminance difference sum total $F_y^+$ in the y direction and the positive side temporal luminance difference sum total $F_t^{y+}$ in the y direction. The $L_y^+$ calculation section 392 supplies the calculated search range $L_y^+$ on the positive side in the y direction to the reference block determination section 140 through the signal line 329.

The search range $L_x^-$ on the negative side and the search range $L_x^+$ on the positive side in the x direction and the search range $L_y^-$ on the negative side and the search range $L_x^+$ on the positive side in the y direction can be calculated in accordance with the following expression:

$$\begin{pmatrix} L_x^- & L_x^+ \\ L_y^- & L_y^+ \end{pmatrix} = \begin{pmatrix} G(F_t^{x-}, F_x^-) & G(F_t^{x+}, F_x^+) \\ G(F_t^{y-}, F_y^-) & G(F_t^{y+}, F_y^+) \end{pmatrix} \quad \text{expression 13}$$

In this manner, by producing search ranges on the positive side and the negative side in the different directions by means of the search range production section 320, a search region can be defined asymmetrically in the different directions. Consequently, since a search range can be defined more appropriately than that by the configuration of FIG. 9, a motion vector can be detected with a higher degree of accuracy. Further, since the search region can be suppressed to the minimum, the processing amount by block matching can be minimized. It is to be noted that, with the present configuration, the number of registers in the motion vector detection apparatus 300 is great. Therefore, a modification described below is improved so as to decrease the number of registers.

[Modification to the Second Example of the Configuration of the Search Range Production Section]

Figure 12:
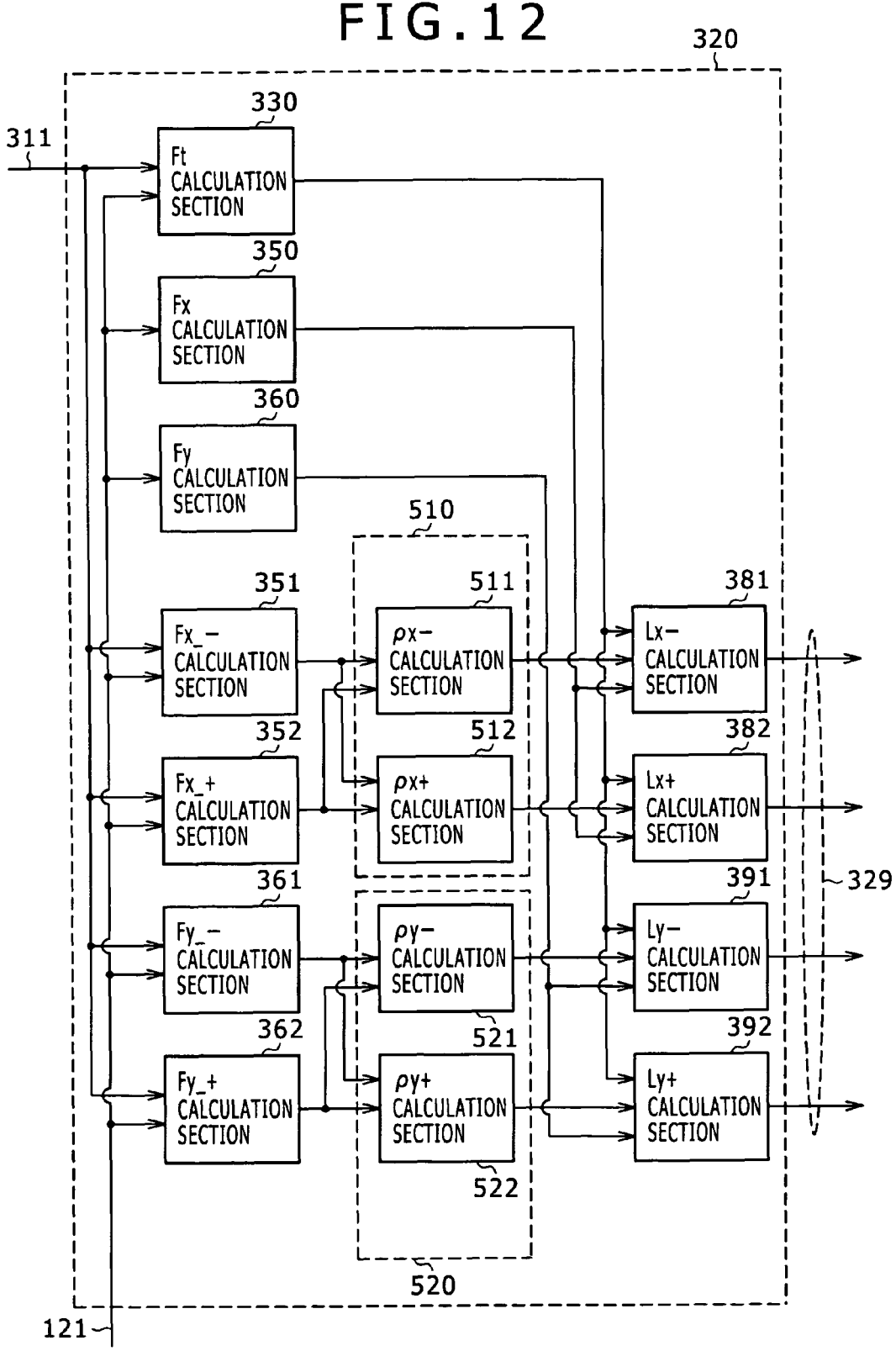
FIG. 12 is a block diagram showing a modification to the second example of the configuration of the search range production section shown in FIG. 11.

FIG. 12 shows a modification to the second example of the configuration of the search range production section 320 where the search range is set asymmetrically in the second embodiment of the present invention.

Referring to FIG. 12, the base block determination section 120 includes a $\rho_x$ calculation section 510 and a $\rho_y$ calculation section 520 in place of the $F_t$ calculation section 330 in the configuration described hereinabove with reference to FIG. 11, and further includes an $F_t$ calculation section 330, an $F_x$ calculation section 350 and an $F_y$ calculation section 360 described hereinabove with reference to FIG. 9. Since the $F_x^-$ calculation section 351, $F_x^+$ calculation section 352, $F_y^-$ calculation section 361 and $F_y^+$ calculation section 362 are similar to those described hereinabove with reference to FIG. 11, overlapping description of them is omitted herein to avoid redundancy. Also the $F_t$ calculation section 330, $F_x$ calculation section 350 and $F_y$ calculation section 360 are similar to those described hereinabove with reference to FIG. 9, and therefore, overlapping description of them is omitted herein to avoid redundancy.

The $\rho_x$ calculation section 510 calculates a positive side likelihood and a negative side likelihood in the x direction based on the negative side spatial luminance difference sum total $F_x^-$ and the positive side spatial luminance difference sum total $F_x^+$ in the x direction. The $\rho_x$ calculation section 510 includes a $\rho_x^-$ calculation section 511 and a $\rho_x^+$ calculation section 512.

The $\rho_x^-$ calculation section 511 calculates the negative side likelihood $\rho_x^-$ in the x direction based on the negative side spatial luminance difference sum total $F_x^-$ and the positive side spatial luminance difference sum total $F_x^+$ in the x direction. The $\rho_x^-$ calculation section 511 supplies the calculated negative side likelihood $\rho_x^-$ in the x direction to the $L_x^-$ calculation section 381.

The $\rho_x^+$ calculation section 512 calculates the positive side likelihood $\rho_x^+$ in the x direction based on the negative side spatial luminance difference sum total $F_x^-$ and the positive side spatial luminance difference sum total $F_x^+$ in the x direction. The $\rho_x^+$ calculation section 512 supplies the calculated positive side likelihood $\rho_x^+$ in the x direction to the $L_x^+$ calculation section 382.

The $\rho_y$ calculation section 520 calculates the positive side likelihood and the negative side likelihood in the y direction based on the negative side spatial luminance difference sum total $F_y^-$ and the positive side spatial luminance difference sum total $F_y^+$ in the y direction. The $\rho_y$ calculation section 520 includes a $\rho_y^-$ calculation section 521 and a $\rho_y^+$ calculation section 522.

The $\rho_y^-$ calculation section 521 calculates the negative side likelihood $\rho_y^-$ in the y direction based on the negative side spatial luminance difference sum total $F_y^-$ and the positive side spatial luminance difference sum total $F_y^+$ in the y direction. The $\rho_y^-$ calculation section 521 supplies the calculated negative side likelihood $\rho_y^-$ in the y direction to the $L_y^-$ calculation section 391.

The $\rho_y^+$ calculation section 522 calculates the positive side likelihood $\rho_y^+$ in the y direction based on the negative side spatial luminance difference sum total $F_y^-$ and the positive side spatial luminance difference sum total $F_y^+$ in the y direction. The $\rho_y^+$ calculation section 522 supplies the calculated positive side likelihood $\rho_y^+$ in the y direction to the $L_y^+$ calculation section 392.

The negative side likelihood $\rho^-$ in the x direction, positive side likelihood $\rho_x^+$ in the x direction, negative side likelihood $\rho_y^-$ in the y direction and positive side likelihood $\rho_y^+$ in the y direction can be calculated in accordance with the following expression:

$$\begin{pmatrix} \rho_x^- & \rho_x^+ \\ \rho_y^- & \rho_y^+ \end{pmatrix} = \begin{pmatrix} \frac{F_x^-}{\max(F_x^-, F_x^+)} & \frac{F_x^+}{\max(F_x^-, F_x^+)} \\ \frac{F_y^-}{\max(F_y^-, F_y^+)} & \frac{F_y^+}{\max(F_y^-, F_y^+)} \end{pmatrix} \quad \text{expression 14}$$

In this manner, the $\rho_x$ calculation section 510 and the $\rho_y$ calculation section 520 use the positive side luminance difference sum total and the negative side luminance difference sum total to calculate the likelihoods in the upward or downward direction and the leftward or rightward direction of a moving body included in the base block.

The $L_x^-$ calculation section 381 calculates the search range $L_x^-$ on the negative side in the x direction based on the negative side spatial luminance difference sum total $F_x^-$ in the x direction, the negative side temporal luminance difference sum total $F_t^{x-}$ in the x direction, and the negative side likelihood $\rho_x^-$ in the x direction. The $L_x^-$ calculation section 381 supplies the calculated search range $L_x^-$ on the negative side in the x direction to the reference block determination section 140 trough the signal line 329.

The $L_x^+$ calculation section 382 calculates the search range $L_x^+$ on the positive side in the x direction based on the positive side spatial luminance difference sum total $F_x^+$ in the x direction, the positive side temporal luminance difference sum total $F_t^{x+}$ in the x direction, and the positive side likelihood $\rho_x^+$ in the x direction. The $L_x^+$ calculation section 382 supplies the calculated search range $L_x^+$ on the positive side in the x direction to the reference block determination section 140 trough the signal line 329.

The $L_y^-$ calculation section 391 calculates the search range $L_y^-$ on the negative side in the y direction based on the negative side spatial luminance difference sum total $F_y^-$ in the y direction, the negative side temporal luminance difference sum total $F_t^{y-}$ in the y direction, and the negative side likelihood $\rho_y^-$ in the y direction. The $L_y^-$ calculation section 391 supplies the calculated search range $L_y^-$ on the negative side in the y direction to the reference block determination section 140 trough the signal line 329.

The $L_y^+$ calculation section 392 calculates the search range $L_y^+$ on the positive side in the y direction based on the positive side spatial luminance difference sum total $F_y^+$ in the y direction, the positive side temporal luminance difference sum total $F_t^{y+}$ in the y direction, and the positive side likelihood $\rho_y^+$ in the y direction. The $L_y^+$ calculation section 392 supplies the calculated search range $L_y^+$ on the positive side in the y direction to the reference block determination section 140 trough the signal line 329.

The search range $L_x^-$ on the negative side and the search range $L_x^+$ on the positive side in the x direction and the search range $L_y^-$ on the negative side and the search range $L_y^+$ on the positive side in the y direction described hereinabove can be calculated in accordance with the following expression:

$$\begin{pmatrix} L_x^- & L_x^+ \\ L_y^- & L_y^+ \end{pmatrix} = \begin{pmatrix} \rho_y^- G(F_t, F_x) & \rho_x^+ G(F_t, F_x) \\ \rho_y^- G(F_t, F_y) & \rho_y^+ (F_t, F_y) \end{pmatrix} \quad \text{expression 15}$$

In this manner, by providing the $\rho_x$ calculation section 510 and the $\rho_y$ calculation section 520, the processing amount in calculation of the search ranges on the negative side and the positive side in the different directions can be reduced in comparison with the configuration described hereinabove with reference to FIG. 11.

[Example of Operation of the Motion Vector Detection Apparatus]

Now, operation of the motion vector detection apparatus 300 is described with reference to the drawings.

Figure 13:
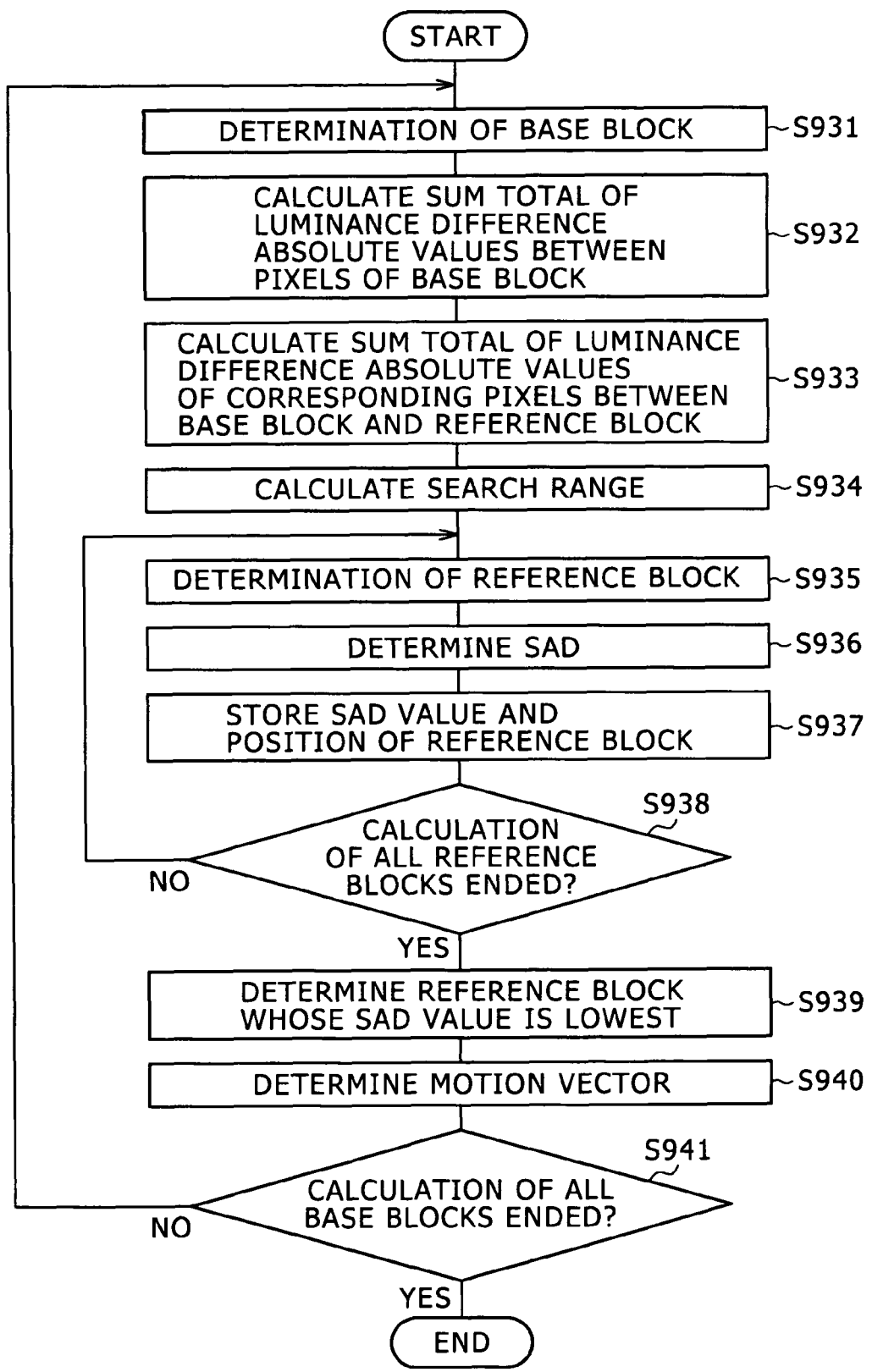
FIG. 13 is a flow chart illustrating an example of a processing procedure in a processing method of the motion vector detection apparatus of FIG. 7.

FIG. 13 illustrates an example of a processing procedure of a processing method of the motion vector detection apparatus 300 according to the second embodiment of the present invention.

Referring to FIG. 13, the base block determination section 120 first determines a base block in a base frame from the base frame buffer 110 at step S931. Then, the $F_s$ calculation section 340 calculates a spatial luminance difference sum total as a sum total of absolute values of spatial luminance differences which are luminance differences between pixels in the base block from the base block determination section 120 at step S932. Then, the $F_t$ calculation section 330 calculates a temporal luminance difference sum total as a sum total of temporal luminance differences which are luminance differences between pixels corresponding to each other in a corresponding block from the corresponding block extraction section 310 and the base block from the base block determination section 120 at step S933. Then, the L calculation section 370 calculates a search range for a reference frame based on the spatial luminance difference sum total from the $F_t$ calculation section 330 and the temporal luminance difference sum total from the $F_s$ calculation section 340 at step S934.

Then, the reference block determination section 140 determines a reference block from within a reference frame from the reference frame buffer 130 at step S935. Then, the correlation calculation section 871 calculates a correlation degree between the base block and the reference block based on the luminance values of the pixels of the base block and the luminance values of the pixels of the reference block at step S936. Then, the correlation degree calculated by the correlation calculation section 871 and the position of the reference block are stored in an associated relationship with each other into the correlation map storage section 872 at step S937. Thereafter, the position acquisition section 873 decides whether or not the correlation degree and the position with regard to all reference blocks determined in the search region are stored in the correlation map storage section 872 at step S938. Then, if the correlation degree and the position with regard to all reference blocks are not stored as yet, then the processing returns to step S935. Consequently, the processes described above are repeated until the correlation degree and the position with regard to all reference blocks set in the search region are stored.

On the other hand, if the correlation degree and the position with regard to all reference blocks are stored, then the position acquisition section 873 acquires the position of that one of the reference blocks which exhibits the lowest correlation degree at step S939. Then, the motion vector calculation section 874 calculates a motion vector based on the position of the reference block from the position acquisition section 873 and the position of the base block at step S940.

Then, it is decided whether or not the motion vector calculated by the motion vector calculation section 874 is calculated with regard to all base blocks at step S941. Then, if the calculation of the motion vector with regard to all base blocks is not completed as yet, then the processing returns to step S941, at which a new base block is determined. Then, the processes at the steps beginning with step S942 are repeated. On the other hand, if the calculation of the motion vector with regard to all reference blocks is completed, then the motion vector calculation process is ended.

In this manner, with the second embodiment of the present invention, since a search region for a motion vector with respect to a base block can be defined appropriately by provision of the search range production section 320, the accuracy in detection of the motion vector can be improved. Further, since the search region can be suppressed to a minimum region, the processing amount by block matching can be reduced. Consequently, power consumption of the motion vector detection apparatus 300 can be reduced.

3. Third Embodiment

[Example of a Configuration of the Motion Detector]

Figure 14:
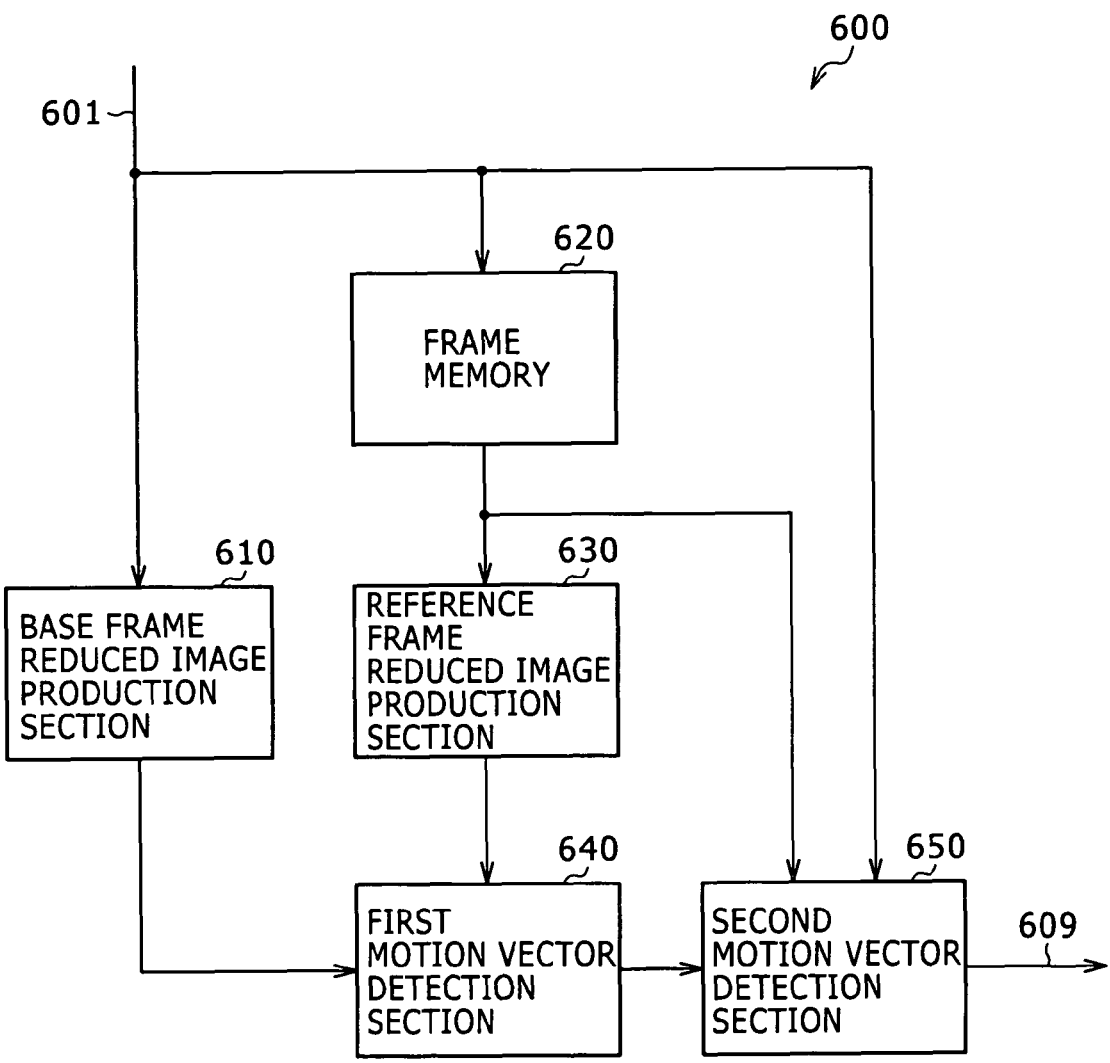
FIG. 14 is a block diagram showing an example of a configuration of a motion vector detection apparatus according to a third embodiment of the present invention.

FIG. 14 shows an example of a configuration of a motion detector 600 according to a third embodiment of the present invention. Referring to FIG. 14, the motion detector 600 carries out hierarchical motion estimation of estimating a motion by detecting motion vectors hierarchically using a reduced image. The motion detector 600 includes a base frame reduced image production section 610, a frame memory 620, a reference frame reduced image production section 630, a first motion vector detection section 640 and a second motion vector detection section 650.

The base frame reduced image production section 610 produces a reduced image of a predetermined magnification of a base frame supplied from a signal line 601. The base frame reduced image production section 610 supplies the produced reduced image as a base frame reduced image to the first motion vector detection section 640.

The frame memory 620 temporarily retains a base frame supplied thereto from the signal line 601. The frame memory 620 supplies the retained base frame as a reference frame to the reference frame reduced image production section 630 and the second motion vector detection section 650.

The reference frame reduced image production section 630 produces a reduced image of a predetermined magnification of a reference frame supplied thereto from the frame memory 620. The reference frame reduced image production section 630 supplies the produced reduced image as a reference frame reduced image to the first motion vector detection section 640.

The first motion vector detection section 640 detects, based on correlation degrees between a base block set in a base frame reduced image and a plurality of reference blocks set in a reference frame reduced image, a motion vector of the base reduced image with respect to the base block. For example, the motion vector detection apparatus 100 described hereinabove with reference to FIG. 1 can be applied to the first motion vector detection section 640. In this instance, since the reduced image is low in resolution, the detection error of a motion vector from a plurality of objects is likely to become great because a unit block includes a great amount of information. Therefore, it is desirable to set a threshold value $D_{th}$ in the weight calculation section 162 to a low value. This makes only those pixels, which have luminance values proximate to a base luminance value, pixels of a high effectiveness degree, and consequently, it is possible to decrease the detection error arising from the fact that a plurality of moving bodies exist in a mixed state.

The first motion vector detection section 640 supplies a motion vector detected with regard to a base block in a base frame reduced image to the second motion vector detection section 650.

The second motion vector detection section 650 detects, based on correlation degrees between a base block set to a base frame and a plurality of reference blocks set to a reference frame, a motion vector with respect to the base block. In particular, the second motion vector detection section 650 defines a search region based on a motion vector from the first motion vector detection section 640. Then, the second motion vector detection section 650 detects a motion vector with respect to a base block in a base frame based on correlation degrees between a plurality of reference blocks set in the defined search region and a base block set in the base frame. For example, the motion vector detection apparatus 100 described hereinabove with reference to FIG. 1 can be applied to the second motion vector detection section 650. In this instance, since an image of each frame has a high resolution, the detection error of a motion vector with regard to a plurality of moving bodies is not very great because the amount of information included in a unit block is small. Therefore, it is preferable to set the threshold value $D_{th}$ in the weight calculation section 162 to a high value. Consequently, a motion vector of a moving body can be detected with a high degree of accuracy.

Further, the second motion vector detection section 650 supplies a detected motion vector with respect to a base block of a base frame to a signal line 609.

Figure 15:
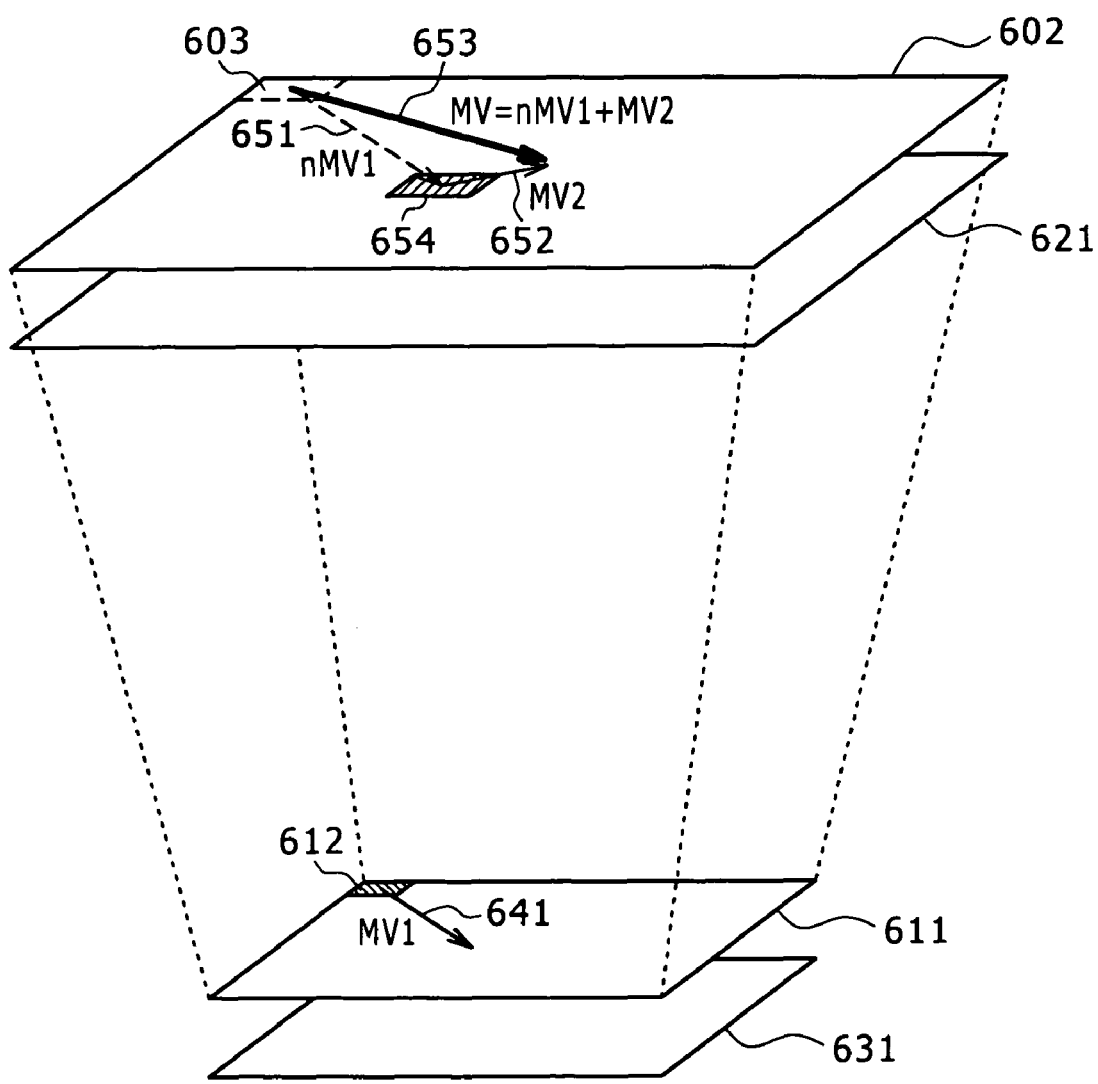
FIG. 15 is a schematic view illustrating a hierarchical search method of the motion vector detection apparatus of FIG. 14.

Here, a hierarchical search technique of detecting a motion vector with respect to a base block of a base frame based on a motion vector from the first motion vector detection section 640 by the second motion vector detection section 650 is described briefly with reference to FIG. 15.

[Example of Detection of a Motion Vector]

FIG. 15 illustrates a hierarchical search technique of the motion detector 600 in the third embodiment of the present invention. Referring to FIG. 15, there are illustrated a base frame 602, a reference frame 621, an estimated block 654, a base reduced frame 611, a reference reduced frame 631, and motion vectors 641 and 651 to 653. The base frame 602 is an image of a current frame of a dynamic picture. The reference frame 621 is an image preceding to the base frame 602 stored in the frame memory 620. A base block 603 is a block of the base frame 602 for detecting a motion vector.

The base reduced frame 611 is a reduced image of the base frame 602 produced by the base frame reduced image production section 610. The reference reduced frame 631 is a reduced image of the reference frame 621 produced by the reference frame reduced image production section 630. A base frame 612 is a block of the base reduced frame 611 corresponding to the base block 603. Here, it is assumed that the base reduced frame 611 and the reference reduced frame 631 are reduced to 1/N time from the base frame 602 and the reference frame 621, respectively.

In this instance, the first motion vector detection section 640 detects a motion vector 641 with respect to the base frame 612 set to the base reduced frame 611. Then, the second motion vector detection section 650 determines the position of the estimated block 654 based on the motion vector 651 obtained by increasing the motion vector 641 detected by the first motion vector detection section 640 to n times. Then, the second motion vector detection section 650 detects the motion vector 652 with respect to the position of the estimated block 654 and calculates the motion vector 653 with respect to the base block 603 of the base frame 602 based on the motion vector 651 and the motion vector 652.

By applying the motion vector detection apparatus 100 to the first and second motion vector detection sections 640 and 650 in this manner, also where a plurality of moving bodies move in a frame, a motion vector can be detected with a high degree of accuracy.

4. Fourth Embodiment

[Example of a Configuration of the Motion Vector Detection Apparatus]

Figure 16:
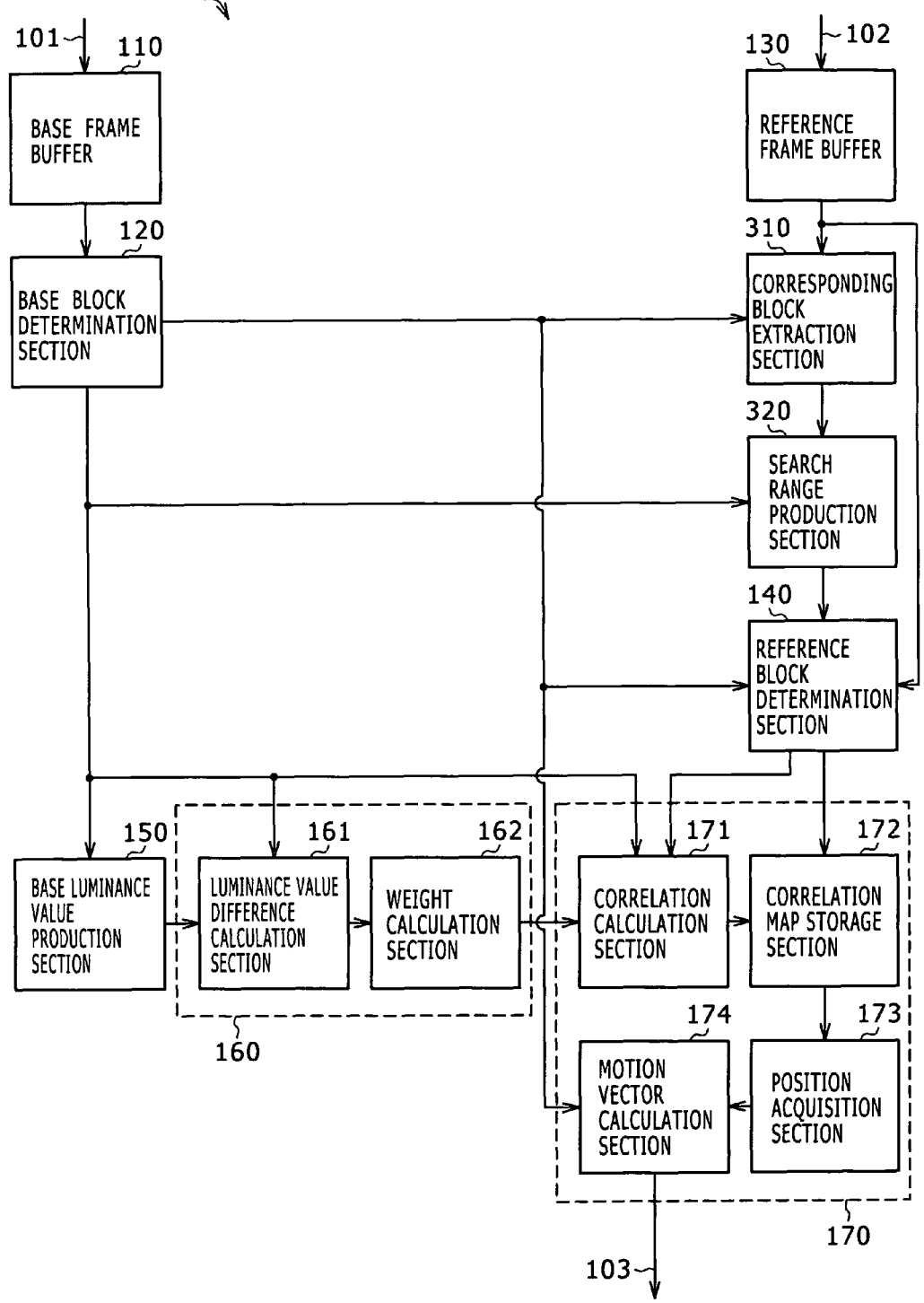
FIG. 16 is a block diagram showing an example of a configuration of a motion vector detection apparatus according to a fourth embodiment of the present invention.

FIG. 16 shows an example of a configuration of a motion vector detection apparatus 700 according to a fourth embodiment of the present invention. Referring to FIG. 16, the motion vector detection apparatus 700 includes the corresponding block extraction section 310 and the search range production section 320 described hereinabove with reference to FIG. 7 in addition to the components described hereinabove with reference to FIG. 1. The corresponding block extraction section 310 and the search range production section 320 in the motion vector detection apparatus 700 are similar to those described hereinabove with reference to FIG. 7, and therefore, overlapping description of them is omitted herein to avoid redundancy. Further, the other components of the motion vector detection apparatus 700 are similar to those described hereinabove with reference to FIG. 1, and therefore, overlapping description of them is omitted herein to avoid redundancy.

In this manner, in the fourth embodiment of the present invention, since the effectiveness calculation section 160 is provided, even if a plurality of moving bodies are included in a frame, a motion vector can be detected with a high degree of accuracy. Further, the search region can be optimized to reduce the calculation process of the correlation degree by block matching.

In this manner, with the embodiment of the present invention, the effectiveness degree corresponding to each pixel position of a base block can be calculated to improve the detection accuracy of a motion vector with respect to the base block.

It is to be noted that an example wherein the motion vector detection apparatus 100 and 700 according to the embodiments of the present invention are applied to an image pickup apparatus 710 is described with reference to FIG. 17.

FIG. 17 shows an example of a configuration of the image pickup apparatus 710 according to the embodiment of the present invention. Referring to FIG. 17, the image pickup apparatus 710 includes a control section 711, an image pickup section 712, a signal processing section 715, a face detection section 716 and a motion vector detection section 717. The image pickup apparatus 710 further includes a blurring correction section 718, an image storage section 719, a bus 721, a user interface 722, an image compression-decompression section 725, a storage medium 726, an input/output terminal 727, a memory 728 and a vibration sensor 729. It is to be noted that transfer of an image signal between different blocks is carried out by direct communication or by communication through the image storage section 719 or the bus 721.

The control section 711 controls the components of the image pickup apparatus 710 based on various control programs stored in a memory not shown.

The image pickup section 712 includes an optical system 713 and an image pickup device 714, and photoelectrically coverts incident light from an image pickup object into an electric signal and outputs the electric signal to the signal processing section 715. The optical system 713 includes a plurality of lens groups including a focusing lens, a zoom lens, a blurring correcting lens and a blurring correcting prism and outputs incident light from an image pickup object inputted through the lens groups to the image pickup device 714. The image pickup device 714 photoelectrically converts the incident light outputted from the optical system 713 and outputs a resulting electric signal to the signal processing section 715. It is to be noted that the image pickup section 712 can optically correct blurring caused and detected by movement or inclination of the blurring correcting lens, deformation or inclination of the blurring correcting prism, movement of the image pickup device 714 and so forth. Such optical correlation is carried out under the control of the control section 711.

The signal processing section 715 carries out various signal processes for an electric signal outputted from the image pickup device 714 and outputs image data obtained by the signal processes to the image storage section 719, image compression-decompression section 725, user interface 722 and face detection section 716. The signal processes by the signal processing section 715 include a noise reduction process, a level correction process, an A/D conversion process and a color correction process. Further, the signal processing section 715 executes various image processes for an image inputted from the associated blocks in accordance with an instruction from the control section 711.

The face detection section 716 detects the face of a person included in an image corresponding to inputted image data.

The motion vector detection section 717 detects a motion vector of each of blocks, into which an image corresponding to inputted image data is divided, by an image process and outputs a value corresponding to the detected motion vector to the control section 711. To the motion vector detection section 717, the motion vector detection apparatus 100 and 700 according to the embodiments of the present invention can be applied.

The blurring correction section 718 moves, based on a blurring correction amount and so forth calculated based on the motion vectors detected by the motion vector detection section 717, the position of the image corresponding to the inputted image to correct the blurring of the image. It is to be noted that the blurring correction section 718 includes electronic blurring correction means and optical blurring correction means.

It is to be noted that an image whose blurring is corrected by the blurring correction section 718 is outputted to the image compression-decompression section 725. Then, the image compression-decompression section 725 carries out an image compression process for the image whose blurring is corrected and records the resulting image on the storage medium 726. Further, the image whose blurring is corrected is displayed on a display section 723.

The image storage section 719 stores image data of an object of processing by the image pickup apparatus 710.

The bus 721 is a shared bus for transmitting image data. The user interface 722 includes a display section 723 and a selection acceptance section 724 and provides an interface to a user who uses the image pickup apparatus 710.

The display section 723 displays an image corresponding to image data outputted from the signal processing section 715 or the image compression-decompression section 725. The display section 723 displays, for example, a picked up image which is an image of an image pickup object picked up by the image pickup apparatus 710.

The selection acceptance section 724 converts selection information inputted by the user into an electric signal and outputs the electric signal to the control section 711. For example, if the face detection section 716 detects the face from within the picked up image outputted from the image pickup section 712, then a blurring correction process based on the face detected from within the picked up image is carried out by the image pickup apparatus 710. In this manner, where a picked up image includes the face, it is possible to establish a mode (ON setting) wherein a blurring correction process is executed for the face or another mode (OFF setting) wherein the blurring correction process is not executed for the face. Such ON/OFF setting is carried out by the selection acceptance section 724.

It is to be noted that the user interface 722 may be configured such that, for example, the display section 723 and the selection acceptance section 724 are formed integrally as a touch panel or the display section 723 is formed from a liquid crystal display (LCD) unit and the selection acceptance section 724 is formed as hardware keys.

The image compression-decompression section 725 compresses or decompresses various image data inputted thereto in response to various image processes. For example, image data for which a compression process is carried out by the image compression-decompression section 725 is outputted to the storage medium 726 and stored on the storage medium 726. Further, image data for which a decompression process is carried out by the image compression-decompression section 725 is outputted to the image storage section 719, display section 723 and face detection section 716. It is to be noted that the compression method may be, for example, the JPEG (Joint Photographic Experts Group) method.

The storage medium 726 is an image storage medium which stores image data outputted from the image compression-decompression section 725 and outputs the image data stored therein to the image compression-decompression section 725. It is to be noted that, as the image storage medium, a magnetic disk, an optical disk, a semiconductor storage medium, a magnetic tape and so forth are available. Further, the image storage medium includes at least one of an external removable storage medium and a built-in storage medium.

The input/output terminal 727 is used to output image data outputted from the image compression-decompression section 725 to an external apparatus such as an external storage medium therethrough and output image data inputted from the external storage medium to the image compression-decompression section 725 therethrough.

The memory 728 is a volatile/nonvolatile storage medium for storing various types of information.

The vibration sensor 729 detects vibration of the image pickup apparatus 710 and detects a blurring component which does not rely upon an image, that is, a blurring component of the body of the image pickup apparatus 710, and outputs various kinds of detected information to the control section 711. The vibration sensor 729 can be implemented using, for example, a gyro sensor, a velocity sensor, or an acceleration sensor.

In this manner, by applying the motion vector detection apparatus 100 and 700 according to the embodiments of the present invention to the image pickup apparatus 710, the detection accuracy of a motion vector by the image pickup apparatus 710 can be improved.

It is to be noted that, while, in the foregoing description of the embodiments of the present invention, the reference frame is a frame preceding by one frame distance to the base frame, the present invention can be applied also where the reference frame is a current frame and the base frame is a frame preceding by one frame distance to the reference frame.

It is to be noted that, while, in the embodiments of the present invention described above, the luminance value with regard to all pixels of the base block is used, the luminance value of only some of the pixels of the base block may be used alternatively.

Further, it is to be noted that the embodiments of the present invention can be applied to an image encoding process for compressing a dynamic picture in a storage process in an image pickup apparatus or an image storage apparatus such as a camcorder or a video recorder.

Furthermore, it is to be noted that the embodiments of the present invention can be applied to a blurring moderation process in a reproduction process or a storage process in an image pickup apparatus or an image storage apparatus such as a camcorder or a video recorder wherein blurring when a dynamic image is picked up is detected.

Further, it is to be noted that the embodiments of the present invention can be applied to a noise reduction process in a reproduction process or a storage process in an image pickup apparatus or an image storage apparatus such as a camcorder or a video recorder wherein random noise arising from an image pickup processing section is detected.

Further, it is to be noted that the embodiments of the present invention can be applied to a frame interpolation process in a reproduction process for reducing shortage of the resolution in a temporal direction by shortage in frames in an image storage apparatus such as a video recorder.

Further, it is to be noted that the embodiments of the present invention indicate examples for embodying the present invention and have a corresponding relationship to different features of the present invention as described in the appended claims. However, the present invention is not limited to the embodiments but various modifications can be made without departing from the spirit and scope of the present invention.

Further, the processing procedure described in the description of the embodiments of the present invention may be grasped as a method having such a series of steps as described above or may be grasped as a program for causing a computer to execute the series of steps or as a storage medium for storing the program. As the storage medium, a CD (Compact Disc), an MD (Mini Disc), a DVD (Digital Versatile Disk), a memory card, a blue ray disk (Blu-ray Disc (registered trademark)) and so forth are available.

The present application contains subject matter related to that disclosed in Japanese Priority Patent Application JP 2008-284627 filed with the Japan Patent Office on Nov. 5, 2008, the entire content of which is hereby incorporated by reference.

What is claimed is:

1. A motion vector detection apparatus, comprising:
a base luminance value production section configured to produce, based on a luminance value of a predetermined one of pixels of a base block set in a base frame, a base luminance value of the base block;
an effectiveness calculation section configured to calculate an effectiveness degree of each of the pixels of the base block based on luminance values of the pixels of the base block and the base luminance value;
a correlation calculation section configured to calculate, based on the luminance values of the pixels of the base block, luminance values of pixels in a plurality of reference blocks set in a reference frame which correspond to pixel positions of the base block and the effectiveness degrees corresponding to the pixel positions of the base block, a correlation degree of the reference block with the base block for each of the reference blocks;
a position acquisition section configured to acquire the position of that one of the reference blocks set in the reference frame which exhibits the highest correlation degree with the base block; and
a motion vector calculation section configured to calculate a motion vector based on the position of the reference block acquired by said position acquisition section and the position of the base block.

2. The motion vector detection apparatus according to claim 1, wherein said effectiveness calculation section calculates the effectiveness degree such that, where a difference absolute value between the base luminance value and the luminance value of each of the pixels of the base block is lower than a predetermined threshold value, the effectiveness degree exhibits a value higher than that in any other case.

3. The motion vector detection apparatus according to claim 2, wherein said effectiveness calculation section calculates the effectiveness degree such that, where the difference absolute value between the base luminance value and the luminance value of each of the pixels of the base block is lower than the predetermined threshold value, the effectiveness degree exhibits a fixed value.

4. The motion vector detection apparatus according to claim 2, wherein said effectiveness calculation section calculates the effectiveness degree such that, where the difference absolute value between the base luminance value and the luminance value of each of the pixels of the base block is lower than the predetermined threshold value, the effectiveness degree exhibits a value which increases in inverse proportion to the difference absolute value.

5. The motion vector detection apparatus according to claim 1, wherein said base luminance value production section produces a statistical value based on the luminance value of the predetermined pixel in the base block as the base luminance value.

6. The motion vector detection apparatus according to claim 5, wherein said base luminance value production section produces the statistical value based on the luminance value of the predetermined pixel which is positioned in the proximity of the center of the base block.

7. The motion vector detection apparatus according to claim 1, wherein said base luminance value production section produces a luminance value of one of the pixels in the base block as the base luminance value.

8. The motion vector detection apparatus according to claim 1, wherein said correlation degree calculation section calculates the correlation value of each of the pixels of the reference block based on the luminance values of the pixels of the base block, the luminance values of the pixels of the reference block which correspond to the pixel positions of the base block, and the effectiveness degrees corresponding to the pixel positions of the base block, and carries out sum total arithmetic operation of the values of the pixels to calculate the correlation degree of the reference block.

9. The motion vector detection apparatus according to claim 8, wherein said correlation degree calculation section multiplies a difference absolute value between the luminance value of each of the pixels in the base block and the luminance value of each of the pixels in the reference block which correspond to the pixel positions of the base block by the effectiveness degree corresponding to the pixel position of the base block to calculate the correlation value.

10. A motion vector detection method, comprising the steps of:
producing, based on a luminance value of a predetermined one of pixels of a base block set in a base frame, a base luminance value of the base block;
calculating an effectiveness degree of each of the pixels of the base block based on luminance values of the pixels of the base block and the base luminance value;
calculating, based on the luminance values of the pixels of the base block, luminance values of pixels in a plurality of reference blocks set in a reference frame which correspond to pixel positions of the base block and the effectiveness degrees corresponding to the pixel positions of the base block, a correlation degree of the reference block with the base block for each of the reference blocks;
acquiring the position of that one of the reference blocks set in the reference frame which exhibits the highest correlation degree with the base block; and
calculating a motion vector based on the position of the reference block acquired at the position acquisition step and the position of the base block.

11. A program for causing a computer to execute the steps of:
producing, based on a luminance value of a predetermined one of pixels of a base block set in a base frame, a base luminance value of the base block;
calculating an effectiveness degree of each of the pixels of the base block based on luminance values of the pixels of the base block and the base luminance value;

calculating, based on the luminance values of the pixels of the base block, luminance values of pixels in a plurality of reference blocks set in a reference frame which correspond to pixel positions of the base block and the effectiveness degrees corresponding to the pixel positions of the base block, a correlation degree of the reference block with the base block for each of the reference blocks;

acquiring the position of that one of the reference blocks set in the reference frame which exhibits the highest correlation degree with the base block; and calculating a motion vector based on the position of the reference block acquired at the position acquisition step and the position of the base block.

12. A motion vector detection apparatus, comprising:

base luminance value production means for producing, based on a luminance value of a predetermined one of pixels of a base block set in a base frame, a base luminance value of the base block;

effectiveness calculation means for calculating an effectiveness degree of each of the pixels of the base block based on luminance values of the pixels of the base block and the base luminance value;

correlation calculation means for calculating, based on the luminance values of the pixels of the base block, luminance values of pixels in a plurality of reference blocks set in a reference frame which correspond to pixel positions of the base block and the effectiveness degrees corresponding to the pixel positions of the base block, a correlation degree of the reference block with the base block for each of the reference blocks;

position acquisition means for acquiring the position of that one of the reference blocks set in the reference frame which exhibits the highest correlation degree with the base block; and motion vector calculation means for calculating a motion vector based on the position of the reference block acquired by said position acquisition means and the position of the base block.

* * * * *